US011023806B2

(12) United States Patent
Sawada et al.

(10) Patent No.: US 11,023,806 B2
(45) Date of Patent: Jun. 1, 2021

(54) LEARNING APPARATUS, IDENTIFYING APPARATUS, LEARNING AND IDENTIFYING SYSTEM, AND RECORDING MEDIUM

(71) Applicant: Panasonic Intellectual Property Management Co., Ltd., Osaka (JP)

(72) Inventors: Yoshihide Sawada, Kyoto (JP); Toru Nakada, Kyoto (JP); Yoshikuni Sato, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 909 days.

(21) Appl. No.: 15/641,063

(22) Filed: Jul. 3, 2017

(65) Prior Publication Data

US 2018/0025271 A1 Jan. 25, 2018

(30) Foreign Application Priority Data

Jul. 21, 2016 (JP) .............................. JP2016-143631

(51) Int. Cl.
*G06N 3/08* (2006.01)
*G06N 3/04* (2006.01)
*G06F 17/16* (2006.01)

(52) U.S. Cl.
CPC .............. *G06N 3/08* (2013.01); *G06F 17/16* (2013.01); *G06N 3/04* (2013.01); *G06N 3/0454* (2013.01); *G06N 3/084* (2013.01)

(58) Field of Classification Search
CPC .......... G06N 3/08; G06N 3/0454; G06N 3/04; G06N 3/084; G06F 17/16
See application file for complete search history.

(56) References Cited

U.S. PATENT DOCUMENTS

| 5,689,621 A * | 11/1997 | Salam | G06N 3/0454 706/28 |
| 9,786,270 B2 * | 10/2017 | Senior | G10L 15/063 |
| 2006/0184471 A1 * | 8/2006 | Minamino | G10L 15/144 706/16 |

(Continued)

OTHER PUBLICATIONS

Transfer Learning Method using Multi-Prediction Deep Boltzmann Machines for a small scale dataset Yoshihide Sawada, Kazuki Kozuka (Year: 2015).*

(Continued)

*Primary Examiner* — Kakali Chaki
*Assistant Examiner* — Ababacar Seck
(74) *Attorney, Agent, or Firm* — Wenderoth, Lind & Ponack, L.L.P.

(57) ABSTRACT

A learning apparatus includes at least one memory and at least one circuit. The circuit (a) obtains a first neural network that has learned by using source learning data and obtains target learning data, the target learning data including a plurality of first data items each of which is given a first label and a plurality of second data items each of which is given a second label, (b) obtains a plurality of first output vectors by inputting the plurality of first data items to a second neural network and obtains a plurality of second output vectors by inputting the plurality of second data items to the second neural network, and (c) generates a first relation vector corresponding to the first label by using the plurality of first output vectors and generates a second relation vector corresponding to the second label by using the plurality of second output vectors.

14 Claims, 19 Drawing Sheets

(56) References Cited

U.S. PATENT DOCUMENTS

| | | | | |
|---|---|---|---|---|
| 2006/0248026 A1* | 11/2006 | Aoyama | ............... | G05D 1/0221 706/12 |
| 2009/0141969 A1* | 6/2009 | Yu | ........................ | G06K 9/6256 382/157 |
| 2012/0117069 A1* | 5/2012 | Kawanishi | .......... | G06F 16/5838 707/740 |
| 2014/0317035 A1* | 10/2014 | Szatmary | ................ | G06N 3/049 706/27 |
| 2020/0032336 A1* | 1/2020 | Sensen | ................. | C12Q 1/6883 |

OTHER PUBLICATIONS

Whole Layers Transfer Learning of Deep Neural Networksfor a Small Scale Dataset Yoshihide Sawada and Kazuki Kozuka (Year: 2016).*

A theory of learning from different domains Ben-Davidet al. (Year: 2010).*

A Survey on Transfer Learning Sinno Jialin Pan and Qiang Yang (Year: 2010).*

Learning and Transferring Mid-Level Image Representations using Convolutional Neural Networks Oquab et al. (Year: 2014).*

Adapting Visual Category Models to New Domains Saenko et al. (Year: 2010).*

High Resolution Two-Dimensional Electrophoresis of Proteins Patrick H. O'Farrell (Year: 1975).*

Transfer Defect Learning Nam et al. (Year: 2013).*

A New Approach to Change Vector Analysis Using Distance and Similarity Measures Júnior et al. (Year: 2011).*

Maxime Oquab et al., "Learning and Transferring Mid-Level Image Representations using Convolutional Neural Networks", CVPR, Jun. 2014.

* cited by examiner

FIG. 11A

```
OUTPUT VECTOR Y = [0.01, -0.3, 0.1, 0.4, 0.2]

OUTPUT VECTOR Y = [-0.01, -0.15, 0.15, 0.55, 0.3]

OUTPUT VECTOR Y = [0.03, -0.2, 0.1, 0.35, 0.25]
                        ⇩
RELATION VECTOR R = [0.01, -0.22, 0.12, 0.43, 0.25]
```

FIG. 11B

```
OUTPUT VECTOR Y = [0.02, -0.1, 0.14, 0.2, 0.25]

OUTPUT VECTOR Y = [-0.03, -0.1, 0.1, 0.3, 0.35]

OUTPUT VECTOR Y = [0.1, -0.14, 0.12, 0.5, 0.4]
                        ⇩
RELATION VECTOR R = [0.03, -0.11, 0.12, 0.33, 0.33]
```

LEARNING APPARATUS, IDENTIFYING APPARATUS, LEARNING AND IDENTIFYING SYSTEM, AND RECORDING MEDIUM

BACKGROUND

1. Technical Field

The present disclosure relates to a learning apparatus, an identifying apparatus, a learning and identifying system, and a recording medium. More specifically, the present disclosure relates to a learning apparatus, an identifying apparatus, a learning and identifying system, and a recording medium in which transfer learning is performed by using a neural network.

2. Description of the Related Art

In recent years, studies on transfer learning in a neural network have been conducted. Transfer learning in a neural network is deep learning for adapting a result of learning performed by using data with an answer label different from an answer label of a problem to be solved (hereinafter referred to as source learning data), so as to use the result of learning for feature extraction, such as classification and/or regression of target data with an answer label of a problem to actually be solved (hereinafter referred to as target learning data).

For example, Maxime Oquab, Leon Bottou, Ivan Laptev, Josef Sivic, "Learning and Transferring Mid-Level Image Representations using Convolutional Neural Networks", CVPR, June 2014, discloses a method of transfer learning, that is, a method for causing a multilayer neural network that has been subjected to deep learning using source learning data to further learn so as to adapt to target learning data, More specifically, the foregoing document discloses that lower layers from an input layer to a certain hidden layer of a multilayer neural network that has been subjected to deep learning are used as-is as a generic feature extractor. Also, the foregoing document discloses that upper layers from a hidden layer that receives output of the certain hidden layer to an output layer of the multilayer neural network are replaced with newly constructed adaptive layers (new hidden layer and output layer), and learning of the adaptive layers is performed by using target learning data.

SUMMARY

The inventors found several issues that may undermine learning effects, such as overfitting or a decrease in identification accuracy, regarding the transfer learning disclosed in the foregoing document.

One non-limiting and exemplary embodiment provides a learning apparatus that is at least capable of suppressing a decrease in identification accuracy.

In one general aspect, the techniques disclosed here feature a learning apparatus including at least one memory and at least one circuit. The circuit (a) obtains a first neural network that has learned by using source learning data which is learning data with answer labels in a source domain and obtains target learning data which is learning data with answer labels in a target domain, the target learning data including a plurality of first data items each of which is given a first label and a plurality of second data items each of which is given a second label, (b) obtains a plurality of first output vectors by inputting the plurality of first data items to a second neural network and obtains a plurality of second output vectors by inputting the plurality of second data items to the second neural network, the first neural network and the second neural network having identical weighting values, identical numbers of hidden layers, identical numbers of neurons in each of the hidden layers, identical numbers of neurons in an input layer, and identical numbers of neurons in an output layer, and (c) generates a first relation vector corresponding to the first label by using the plurality of first output vectors and generates a second relation vector corresponding to the second label by using the plurality of second output vectors.

It should be noted that general or specific embodiments may be implemented as a system, a method, an integrated circuit, a computer program, a computer-readable recording medium, or any selective combination thereof. The computer-readable recording medium includes a compact disc-read only memory (CD-ROM).

According to an embodiment of the present disclosure, there is provided a learning apparatus that is at least capable of suppressing a decrease in identification accuracy. Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 11A is a diagram illustrating an example of a relation vector regarding "sepsis";

FIG. 11B is a diagram illustrating an example of a relation vector regarding "non-sepsis";

DETAILED DESCRIPTION

Figure 1:
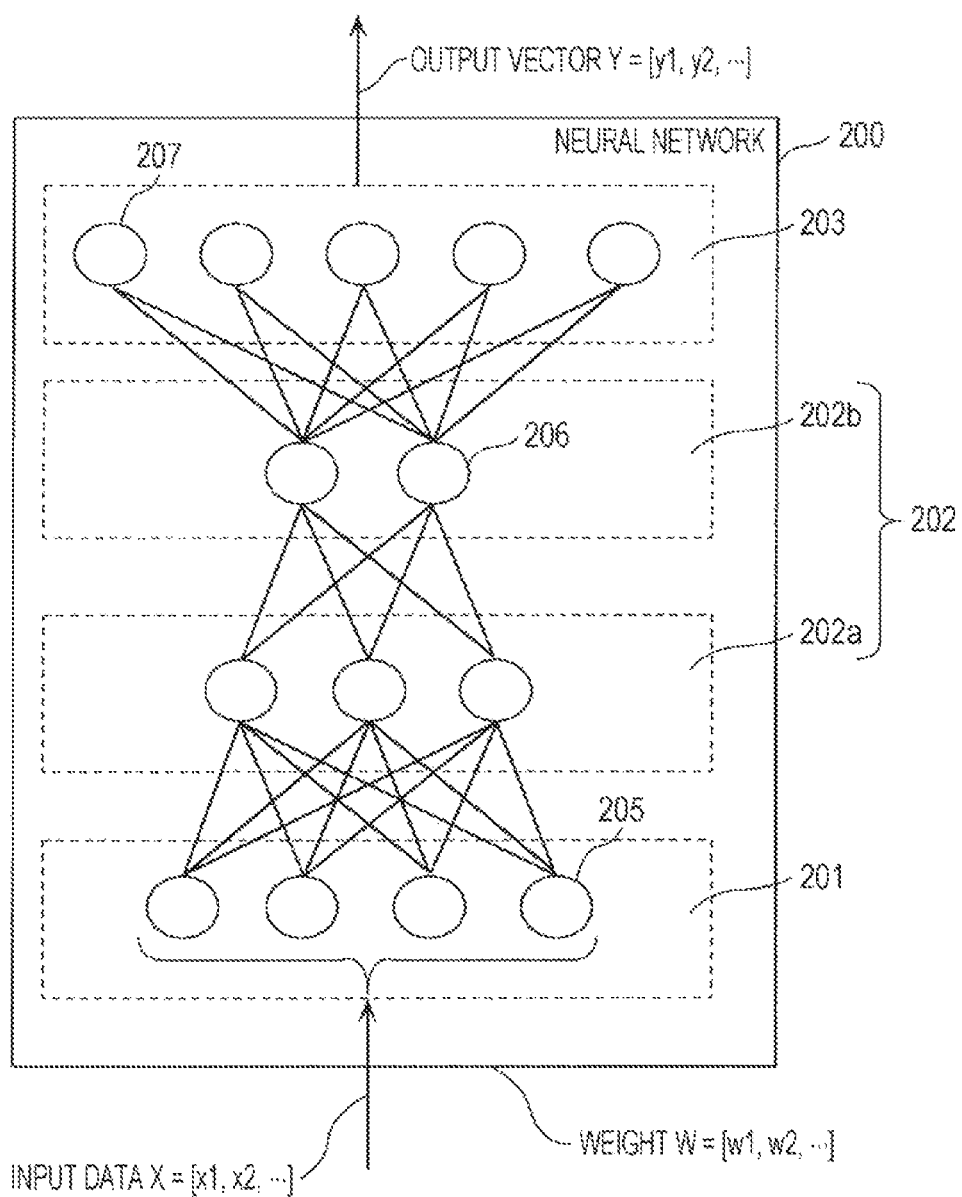
FIG. 1 is a conceptual diagram for describing a computational model of computation performed by a neural network.

Underlying Knowledge Forming Basis of the Present Disclosure

In the transfer learning disclosed in Maxime Oquab, Leon Bottou, Ivan Laptev, Josef Sivic, "Learning and Transferring Mid-Level Image Representations using Convolutional Neural Networks", CVPR, June 2014, lower layers from an input layer to a certain hidden layer of a multilayer neural network that has been subjected to deep learning are used as-is as a generic feature extractor. Also, in the multilayer neural network, upper layers from a hidden layer that receives output of the certain hidden layer to an output layer are replaced with newly constructed adaptive layers (new hidden layer and output layer), and learning of the adaptive layers is performed by using target learning data.

The foregoing document also discloses an experiment in which a multilayer neural network emulated by software that is operated by an image processor is caused to perform deep learning by using about 1.2 million source images as source learning data and then the above-described transfer learning is performed by using different types of target images as target learning data. The document also discloses a result of the experiment that, although the target images are images of types different from the source images, the accuracy of identifying an object and operation represented in the target images is increased through the transfer learning.

However, the inventors found several issues that may undermine learning effects regarding the transfer learning disclosed in the foregoing document.

More specifically, in the transfer learning disclosed in the foregoing document, lower layers of a multilayer neural network that has been subjected to deep learning are used as-is whereas upper layers are newly constructed, and learning is performed so as to adapt to target learning data. However, there is no clear standard for determining a preferred range of available lower layers. Thus, it is necessary to newly construct preferred upper layers. Furthermore, a problem may arise if the target learning data is relatively small data. That is, if newly constructed upper layers are caused to learn from an initial state by using the relatively small target learning data, overfitting is likely to occur. In addition, since the lower layers and the upper layers are caused to learn by using different data items (source learning data and target learning data), an adverse effect of decreased identification accuracy may occur according to a combination of data items.

Accordingly, the inventors have conceived of a learning apparatus, an identifying apparatus, a learning and identifying system, and a recording medium that are disclosed below in order to address at least an issue of a decrease in identification accuracy.

A learning apparatus according to an aspect of the present disclosure includes at least one memory and at least one circuit. The circuit (a) obtains a first neural network that has learned by using source learning data which is learning data with answer labels in a source domain and obtains target learning data which is learning data with answer labels in a target domain, the target learning data including a plurality of first data items each of which is given a first label and a plurality of second data items each of which is given a second label, (b) obtains a plurality of first output vectors by inputting the plurality of first data items to a second neural network and obtains a plurality of second output vectors by inputting the plurality of second data items to the second neural network, the first neural network and the second neural network having identical weighting values, identical numbers of hidden layers, identical numbers of neurons in each of the hidden layers, identical numbers of neurons in an input layer, and identical numbers of neurons in an output layer, and (c) generates a first relation vector corresponding to the first label by using the plurality of first output vectors and generates a second relation vector corresponding to the second label by using the plurality of second output vectors.

With this configuration, it is possible to perform transfer learning for adapting the second neural network to the target learning data, the second neural network being a target neural network in which structure information and weighting values of the source neural network, that is, the first neural network, are used as-is.

Accordingly, at least a decrease in identification accuracy can be suppressed. Furthermore, it is not necessary to change the structure information and weighting values of the source neural network, that is, the first neural network, by using the target learning data in transfer learning, and there is no adverse effect of overfitting that may be caused by changing the structure information and weighting values.

Here, for example, (i) an output vector obtained by inputting a first data item that is given the first label to the second neural network is closer to the first relation vector than to the second relation vector, and (ii) an output vector obtained by inputting a second data item that is given the second label to the second neural network is closer to the second relation vector than to the first relation vector.

For example, the circuit may (d) update weight information on the second neural network by using the first relation vector and the second relation vector, and in (d), the circuit may update the weight information by performing learning in which the plurality of first output vectors that are outputs for the plurality of first data items take the first relation vector as an answer, and the plurality of second output vectors that are outputs for the plurality of second data items take the second relation vector as an answer.

With this configuration, the weighting values of the target neural network, that is, the second neural network, are updated through supervised learning using target learning data, with the weighting values of the source neural network that has learned by using source learning data, that is, the first neural network, being initial values. Accordingly, the weighting values of the source neural network that has learned, that is, the first neural network, are not used as-is, and overfitting that may occur in the case of learning by using a small amount of target learning data can be suppressed.

For example, in (c), the circuit may generate an average vector of the plurality of first output vectors as the first relation vector and may generate an average vector of the plurality of second output vectors as the second relation vector.

With this configuration, relation vectors can be uniquely determined by using source learning data and target learning data.

For example, in (c), the circuit may adjust a value of the first relation vector and a value of the second relation vector so that the value of the first relation vector is within a range of a constant multiple of a first standard deviation calculated from the plurality of first output vectors, the value of the second relation vector is within a range of a constant multiple of a second standard deviation calculated from the plurality of second output vectors, and a difference value between the first relation vector and the second relation vector is increased.

With this configuration, in a case where the relation vectors are close to each other, the difference therebetween can be increased, and accordingly the identification accuracy can be increased.

For example, the learning apparatus may hold a plurality of sets of source learning data which is learning data with answer labels, and distance information for calculating similarities among the answer labels. The circuit may (e) calculate distances between all answer labels given to the plurality of sets of source learning data and all answer labels given to the target learning data and select a set of source learning data having a shortest distance from among the plurality of sets of source learning data, (f) generate the first neural network through learning using the selected set of source learning data, and (g) store structure information and weighting values of the generated first neural network in the memory.

With this configuration, the source neural network, that is, the first neural network, can be constructed by using the set of source learning data that is closest to (most similar to) the target learning data.

For example, the target learning data may include a two-dimensional electrophoretic profile of proteins separated based on an isoelectric point and a molecular weight, the first label may indicate sepsis, and the second label may indicate non-sepsis.

With this configuration, whether or not a patient has a disease can be determined by using a two-dimensional electrophoretic profile obtained from the patient.

For example, the source learning data may include a two-dimensional electrophoretic profile of proteins separated based on an isoelectric point and a molecular weight in a healthy person, and an answer label of the source learning data may indicate a healthy person.

An identifying apparatus according to an aspect of the present disclosure includes a first circuit. The first circuit (v) obtains a first relation vector and a second relation vector from a learning apparatus including a second circuit. The second circuit (a) obtains a first neural network that has learned by using source learning data which is learning data with answer labels in a source domain and obtains target learning data which is learning data with answer labels in a target domain, the target learning data including a plurality of first data items each of which is given a first label and a plurality of second data items each of which is given a second label, (b) obtains a plurality of first output vectors by inputting the plurality of first data items to a second neural network and obtains a plurality of second output vectors by inputting the plurality of second data items to the second neural network, the first neural network and the second neural network having identical weighting values, identical numbers of hidden layers, identical numbers of neurons in each of the hidden layers, identical numbers of neurons in an input layer, and identical numbers of neurons in an output layer, and (c) generates the first relation vector corresponding to the first label by using the plurality of first output vectors and generates the second relation vector corresponding to the second label by using the plurality of second output vectors. The first circuit (w) obtains test data which is data without a label and of a type identical to the target learning data, (x) obtains an output vector for the obtained test data by inputting the test data to the second neural network, (y) calculates a distance between the obtained output vector and the first relation vector and a distance between the obtained output vector and the second relation vector, and (z) outputs, as an answer label for the test data, the first label or the second label corresponding to one of the first relation vector and the second relation vector that is closer to the output vector.

A learning and identifying system according to an aspect of the present disclosure includes a learning apparatus including at least one memory and at least one first circuit, and an identifying apparatus including at least one second circuit. The first circuit of the learning apparatus (a) obtains a first neural network that has learned by using source learning data which is learning data with answer labels in a source domain and obtains target learning data which is learning data with answer labels in a target domain, the target learning data including a plurality of first data items each of which is given a first label and a plurality of second data items each of which is given a second label, (b) obtains a plurality of first output vectors by inputting the plurality of first data items to a second neural network and obtains a plurality of second output vectors by inputting the plurality of second data items to the second neural network, the first neural network and the second neural network having identical weighting values, identical numbers of hidden layers, identical numbers of neurons in each of the hidden layers, identical numbers of neurons in an input layer, and identical numbers of neurons in an output layer, and (c) generates a first relation vector corresponding to the first label by using the plurality of first output vectors and generates a second relation vector corresponding to the second label by using the plurality of second output vectors. The second circuit of the identifying apparatus (v) obtains the first relation vector and the second relation vector from the learning apparatus, (w) obtains test data which is data without a label and of a type identical to the target learning data, (x) obtains an output vector for the obtained test data by inputting the test data to the second neural network, (y) calculates a distance between the obtained output vector and the first relation vector and a distance between the obtained output vector and the second relation vector, and (z) outputs, as an answer label for the test data, the first label or the second label corresponding to one of the first relation vector and the second relation vector that is closer to the output vector.

A non-transitory computer-readable recording medium according to an aspect of the present disclosure stores a control program for causing a device including a processor to execute a process. The process causes a circuit included in a learning apparatus to (a) obtain a first neural network that has learned by using source learning data which is learning data with answer labels in a source domain and obtain target learning data which is learning data with answer labels in a target domain, the target learning data including a plurality of first data items each of which is given a first label and a plurality of second data items each of which is given a second label, (b) obtain a plurality of first output vectors by inputting the plurality of first data items to a second neural network and obtain a plurality of second output vectors by inputting the plurality of second data items to the second neural network, the first neural network and the second neural network having identical weighting values, identical numbers of hidden layers, identical numbers of neurons in each of the hidden layers, identical numbers of neurons in an input layer, and identical numbers of neurons in an output layer, and (c) generate a first relation vector corresponding to the first label by using the plurality of first output vectors and generate a second relation vector corresponding to the second label by using the plurality of second output vectors.

A non-transitory computer-readable recording medium according to an aspect of the present disclosure stores a control program for causing a device including a processor to execute a process. The process causes a first circuit included in an identifying apparatus to (v) obtain a first relation vector and a second relation vector from a learning apparatus including a second circuit. The process causes the second circuit to (a) obtain a first neural network that has learned by using source learning data which is learning data with answer labels in a source domain and obtain target learning data which is learning data with answer labels in a target domain, the target learning data including a plurality of first data items each of which is given a first label and a plurality of second data items each of which is given a second label, (b) obtain a plurality of first output vectors by inputting the plurality of first data items to a second neural network and obtain a plurality of second output vectors by inputting the plurality of second data items to the second neural network, the first neural network and the second neural network having identical weighting values, identical numbers of hidden layers, identical numbers of neurons in each of the hidden layers, identical numbers of neurons in an input layer, and identical numbers of neurons in an output layer, and (c) generate the first relation vector corresponding to the first label by using the plurality of first output vectors and generate the second relation vector corresponding to the second label by using the plurality of second output vectors. The process causes the first circuit to (w) obtain test data which is data without a label and of a type identical to the target learning data, (x) obtain an output vector for the obtained test data by inputting the test data to the second neural network, (y) calculate a distance between the obtained output vector and the first relation vector and a distance between the obtained output vector and the second relation vector, and (z) output, as an answer label for the test data, the first label or the second label corresponding to one of the first relation vector and the second relation vector that is closer to the output vector.

A learning apparatus according to an aspect of the present disclosure includes at least one memory and at least one circuit. The circuit (a) obtains a neural network that has learned by using source learning data which is learning data with answer labels in a source domain and obtains target learning data which is learning data with answer labels in a target domain, the target learning data including a plurality of first data items each of which is given a first label and a plurality of second data items each of which is given a second label, (b) obtains a plurality of first output vectors by inputting the plurality of first data items to the neural network and obtains a plurality of second output vectors by inputting the plurality of second data items to the neural network, and (c) generates a first relation vector corresponding to the first label by using the plurality of first output vectors and generates a second relation vector corresponding to the second label by using the plurality of second output vectors.

A learning apparatus according to an aspect of the present disclosure includes a circuit and a memory. The circuit, in a preparation step, (a-1) obtains structure information indicating a structure of a first neural network and first weighting values used to stipulate relationships between neurons included in the first neural network, the first neural network having learned using first pairs of first data items and first answer labels, the first data items corresponding to the first answer labels, the structure information including a first number of hidden layers and indicating which of the neurons belongs to which layer among the hidden layers, an input layer, and an output layer, (a-2) obtains second pairs of second data items and a second answer label, and third pairs of third data items and a third answer label, the second data items corresponding to the second answer label, the third data items corresponding to the third answer label, (a-3) provides a second neural network having a structure identical to the first neural network and second weighting values used to stipulate relationships between neurons included in the second neural network, the second weighting values being identical to the first weighting values, (a-4) inputs the second data items to the second neural network and the third data items to the second neural network, (a-5) obtains second output vectors and third output vectors from the second neural network, each of the second data items corresponding to one of the second output vectors, each of the third data items corresponding to one of the third output vectors, the second output vectors being $x1=[x11, \ldots, x1i], \ldots,$ and $xn=[xn1, \ldots, xni]$, and the third output vectors being $y1=[y11, \ldots, y1i], \ldots,$ and $yn=[yn1, \ldots, yni]$, and (a-6) generates a first relation vector for the second answer label and a second relation vector for the third answer label, the first relation vector being $x=[(x11+ \ldots +xn1)/n, \ldots, (x1i+ \ldots +xni)/n]$, the second relation vector being $y=[(y11+ \ldots +yn1)/n, \ldots (y1i+ \ldots +yni)/n]$. The circuit, in a testing step, (b-1) inputs a test data item to the second neural network, (b-2) obtains an output test vector from the second neural network, the test data item corresponding to the output test vector, the output test vector being $z=[z11, \ldots, z1i]$, (b-3) calculates a first distance between the first relation vector and the output test vector and a second distance between the second relation vector and the output test vector, the first distance being $[\{(x11+ \ldots +xn1)/n-z11\}^2+ \ldots +\{(x1i+ \ldots +xni)/n-z1i\}^2]^{1/2}$, the second distance being $[\{(y11+ \ldots +yn1)/n-z11\}^2+ \ldots +\{(y1i+ \ldots +yni)/n-z1i\}^2]^{1/2}$, and (b-4) outputs the second answer label when the first distance is smaller than the second distance and outputs the third answer label when the second distance is smaller than the first distance.

It should be noted that general or specific embodiments may be implemented as a system, a method, an integrated circuit, a computer program, a computer-readable recording medium such as a CD-ROM, or any selective combination thereof.

Hereinafter, embodiments of the present disclosure will be described in detail with reference to the attached drawings.

The embodiments described below represent general or specific examples. The values, shapes, materials, elements, locations and connection states of the elements, steps, and the order of steps described in the following embodiments are merely examples and do not limit the present disclosure. Among the elements according to the following embodiments, an element that is not described in an independent claim representing the broadest concept will be described as an optional element.

Neural Network

First, a description will be given of a computational model of computation performed by a neural network, with reference to FIGS. 1 and 2.

FIG. 1 is a conceptual diagram for describing a computational model of computation performed by a neural network. A neural network is, as is known, a computer that emulates a biological neural network and performs computation in accordance with a computational model.

As illustrated in FIG. 1, a neural network 200 includes a plurality of units corresponding to neurons (depicted as white circles), which are arranged in an input layer 201, a hidden layer 202, and an output layer 203.

In the example illustrated in FIG. 1, the hidden layer 202 is formed of two hidden layers: a hidden layer 202a and a hidden layer 202b, however, the hidden layer 202 may be formed of a single hidden layer or three or more hidden layers. A neural network including a plurality of hidden layers may be referred to as, in particular, a multilayer neural network apparatus.

Here, a layer near the input layer 201 is referred to as a lower layer, and a layer near the output layer 203 is referred to as an upper layer. In this case, each unit is a computation element that combines computation results received from units in a lower layer in accordance with a weighting value (for example, weighted sum computation) and that transmits a result of the combining to a unit in an upper layer.

The function of the neural network 200 is defined by structure information representing the number of layers included in the neural network 200, the number of units in each layer, and so forth, and a weight W=[w1, w2, . . . ,] representing weighting values used for weighted sum computation in individual units.

As illustrated in FIG. 1, in the neural network 200, input data X=[x1, x2, . . . ,] (pixel values in the case of an image) is input to input units 205 in the input layer 201. Accordingly, weighted sum computation using the weight W=[w1, w2, . . . ,] is performed in hidden units 206 in the hidden layer 202 and output units 207 in the output layer 203, and an output vector Y=[y1, y2, . . . ] is output from the output units 207 in the output layer 203.

In the present disclosure, the specific implementation of the neural network 200 is not limited. The neural network 200 may be implemented by reconfigurable hardware or through emulation by software, for example.

In the present disclosure, learning of the neural network 200 is performed in accordance with a method according to the related art, and a specific method therefor is not limited. For example, the neural network 200 may learn by using a learning apparatus in accordance with a method according to the related art which will be described below.

Figure 2:
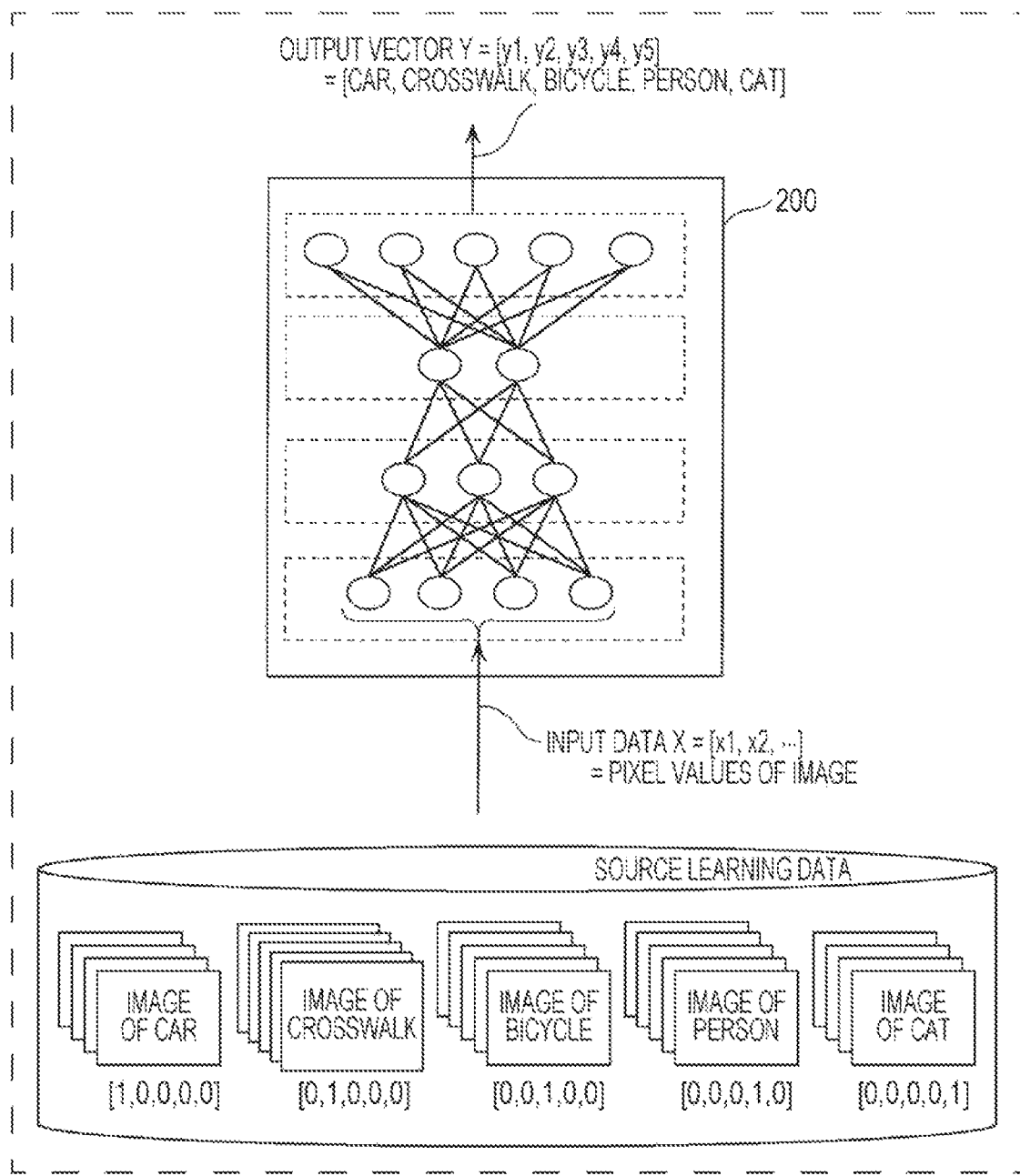
FIG. 2 is a diagram for describing an example of learning of the neural network.

FIG. 2 is a diagram for describing an example of learning of the neural network 200.

FIG. 2 illustrates an example of a case where a source neural network learns by using source learning data, which is data with answer labels. Here, the source neural network is a neural network that learns by using source learning data. The source learning data is learning data with answer labels in a source domain.

In the example illustrated in FIG. 2, the source learning data includes an image of a car, an image of a crosswalk, an image of a bicycle, an image of a person, and an image of a cat. The individual images are attached with, as answer labels, a value [1, 0, 0, 0, 0] representing "car"; a value [0, 1, 0, 0, 0] representing "crosswalk"; a value [0, 0, 1, 0, 0] representing "bicycle"; a value [0, 0, 0, 1, 0] representing "person"; and a value [0, 0, 0, 0, 1] representing "cat", respectively.

The neural network 200 solves a classification problem of classifying the input data X. More specifically, in the neural network 200, individual output units are associated with different answer labels for classifying the input data X, and the weight W is adjusted so that, when each of a plurality of input data items X is input, the output value of the output unit corresponding to a correct answer label of the input data item X approaches 1 and the output values of the other output units approach 0.

Specifically, in the example illustrated in FIG. 2, in the neural network 200, each output unit is associated with one of different answer labels representing "car", "crosswalk", "bicycle", "person", and "cat". The weight W is adjusted through supervised learning so as to decrease a difference between an output vector Y composed of output values of output units that are output in response to input of an image as source learning data, and an answer label attached to the image. For example, if learning is performed by using source learning data having an answer label [1, 0, 0, 0, 0] representing "car", the weight W is adjusted so that the output vector Y is a vector Z=[1, 0, 0, 0, 0]. Hereinafter, the vector Z is referred to as an answer vector.

In the case of performing supervised learning on the neural network 200, for example, a loss function representing an error between an answer vector and an output vector Y may be defined by using input data X, weight W, and an answer label, and the weight W may be updated along a gradient for decreasing the loss function by using a gradient descent method.

In a case where the neural network 200 is a multilayer neural network, in particular, weighting values may be individually adjusted for individual hidden layers through unsupervised learning called layer-wise pre-training before performing the supervised learning. Accordingly, a weight W that enables more accurate classification can be obtained through the following supervised learning.

The weighting values of the neural network 200 may be adjusted by using an algorithm according to the related art, such as back propagation, as well as the above-mentioned gradient descent method. In the learning of the neural network 200, the structure of the neural network 200 may be changed (for example, a unit may be added and/or deleted) without adjusting weighting values. Alternatively, both adjustment of weighting values and change of the structure may be performed. In a case where the neural network 200 is a multilayer neural network, learning may be individually performed in individual layers.

Hereinafter, a description will be given of, based on a plurality of embodiments, transfer learning in the neural network 200 that has learned by using source learning data, which is learning data with answer labels in a source domain. Note that the target neural network described below is a neural network that learns by using target learning data. The target learning data is learning data with answer labels in a target domain.

First Embodiment

Configuration of Learning and Identifying System 1

Figure 3:
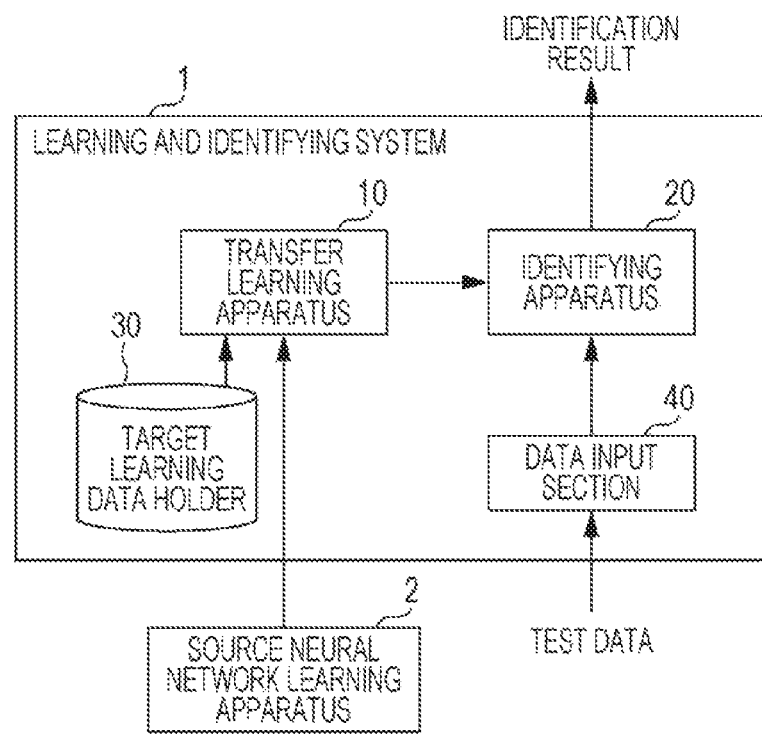
FIG. 3 is a block diagram illustrating an example of a functional configuration of a learning and identifying system according to a first embodiment.

FIG. 3 is a block diagram illustrating an example of a functional configuration of a learning and identifying system 1 according to a first embodiment.

The learning and identifying system 1 illustrated in FIG. 3 includes a transfer learning apparatus 10, an identifying apparatus 20, a target learning data holder 30, and a data input section 40 to which data such as test data is input. The learning and identifying system 1 obtains, from a source neural network learning apparatus 2, structure information and weighting values of a source neural network that has learned by using source learning data.

Configuration of Source Neural Network Learning Apparatus 2

Figure 4:
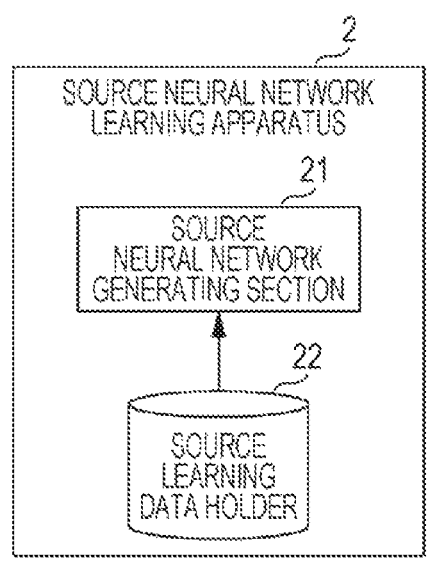
FIG. 4 is a block diagram illustrating an example of a functional configuration of a source neural network learning apparatus according to the first embodiment.

FIG. 4 is a block diagram illustrating an example of a functional configuration of the source neural network learning apparatus 2 according to the first embodiment.

The source neural network learning apparatus 2 illustrated in FIG. 4 includes a source neural network generating section 21 and a source learning data holder 22. The individual elements of the source neural network learning apparatus 2 may be implemented as software functions that are executed through execution of a predetermined program by an image processor and/or microprocessor, for example.

The source learning data holder 22 is a memory, for example, and holds source learning data, which is learning data with answer labels. Examples of the source learning data include an image captured by a digital camera, an image obtained over the Internet, and a two-dimensional electrophoretic profile of proteins obtained from a healthy person and separated based on an isoelectric point and a molecular weight. The two-dimensional electrophoretic profile is attached with an answer label indicating, for example, the type of method for generating the electrophoretic profile, the gender of the healthy person, or the age of the healthy person. The source learning data is relatively large data that enables sufficient learning.

The source neural network generating section 21 obtains structure information representing the structure of the source neural network and weighting values (initial values before learning). For example, a user may input structure information representing the structure of the source neural network and weighting values (initial values before learning) to the source neural network learning apparatus 2 by using a keyboard (not illustrated), and the source neural network generating section 21 may obtain the structure information and the weighting values (initial values before learning). The structure information may include the number of hidden layers, the number of neurons in each hidden layer, the number of neurons in an input layer, the number of neurons in an output layer, information representing a connection relationship between neurons (which neuron is connected to which neutron), an activating function of each neuron, and a bias parameter of each neuron. One weighting value may be defined between two neurons connected to each other.

In the example illustrated in FIG. 2, the structure information may include information indicating that the number of hidden layers is 2, the number of neurons in the input layer is 4, the number of neurons in the output layer is 5, the number of neurons in the hidden layer nearest to the input layer (referred to as a hidden layer 1) is 3, and the number of neurons in the hidden layer nearest to the output layer (referred to as a hidden layer 2) is 2; and information indicating the connection relationship between neurons "(i) the four individual neurons in the input layer are connected to the three neurons in the hidden layer 1, (ii) the three individual neurons in the hidden layer 1 are connected to the two neurons in the hidden layer 2, and (iii) the two individual neurons in the hidden layer 2 are connected to the five neurons in the output layer.

In the example illustrated in FIG. 2, twenty-eight weighting values may be defined. Specifically, twelve weighting values between the individual neurons in the input layer and the individual neurons in the hidden layer 1, six weighting values between the individual neurons in the hidden layer 1 and the individual neurons in the hidden layer 2, and ten weighting values between the individual neurons in the hidden layer 2 and the individual neurons in the output layer may be defined.

The source neural network generating section 21 performs learning of a neural network that has a structure determined based on the structure information by using the source learning data held in the source learning data holder 22, and generates a source neural network. Subsequently, the source neural network generating section 21 outputs the structure information and weighting values (after learning) of the generated source neural network to the learning and identifying system 1. In this embodiment, the source neural network generating section 21 outputs the structure information and weighting values of the generated source neural network to memories (a structure information holder 104 and a weight holder 105) of the transfer learning apparatus 10.

If the learning and identifying system 1 includes the source learning data holder 22, the source neural network learning apparatus 2 does not need to include the source learning data holder 22, Configuration of Target Learning Data Holder 30

The target learning data holder 30 is a memory, for example, and holds target learning data, which is learning data with answer labels. The target learning data includes, for example, a two-dimensional electrophoretic profile of proteins that is given as an answer label indicating sepsis or non-sepsis. The two-dimensional electrophoretic profile of proteins is an image of proteins separated based on an isoelectric point and a molecular weight. The target learning data is smaller than the source learning data.

Configuration of Transfer Learning Apparatus 10

Figure 5:
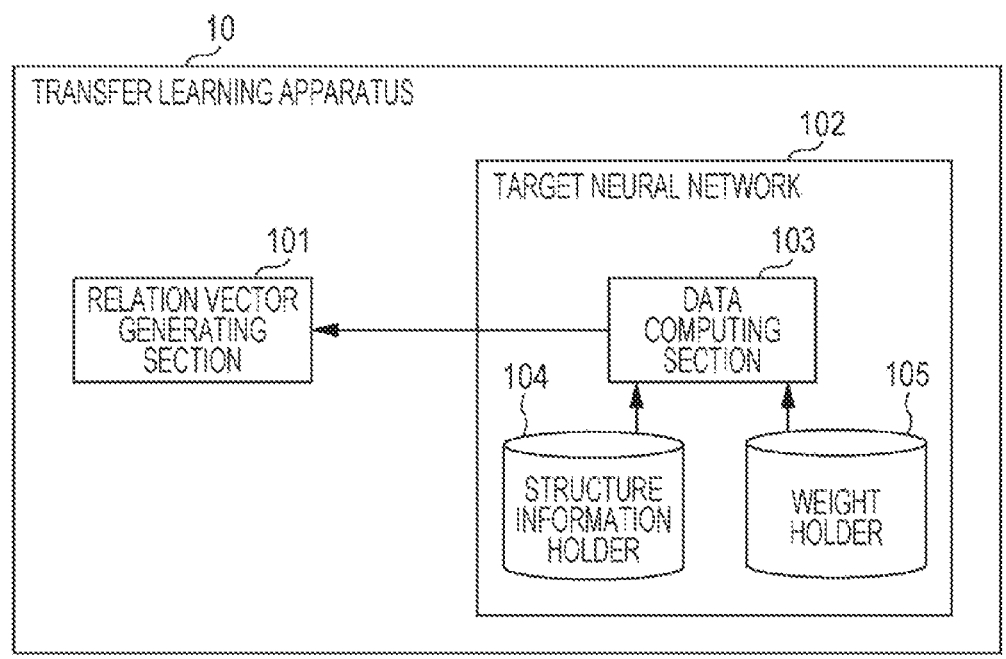
FIG. 5 is a block diagram illustrating an example of a functional configuration of a transfer learning apparatus according to the first embodiment.

FIG. 5 is a block diagram illustrating an example of a functional configuration of the transfer learning apparatus 10 according to the first embodiment.

The transfer learning apparatus 10 is an example of a learning apparatus including, for example, at least one memory and at least one first circuit. The individual elements of the transfer learning apparatus 10 may be implemented as software functions that are executed through execution of a predetermined program by an image processor and/or microprocessor, or may be implemented by the first circuit and the memory, for example.

The transfer learning apparatus 10 obtains structure information and weighting values of a source neural network that has learned by using source learning data which is learning data with answer labels in a source domain. Specifically, the structure information holder 104 and the weight holder 105 receive the structure information and weighting values of the source neural network from the source neural network generating section 21. The transfer learning apparatus 10 obtains, as target learning data which is learning data with answer labels in a target domain, a plurality of first data items each of which is given a first label and a plurality of second data items each of which is given a second label, from the target learning data holder 30, and inputs the obtained target learning data to a target neural network 102 that is constructed by using the structure information and weighting values of the source neural network. The plurality of first data items and the plurality of second data items are input to an input layer of the target neural network 102. The first label and second label do not need to be input to the input layer of the target neural network 102. Subsequently, the transfer learning apparatus 10 obtains a plurality of first output vectors, which are outputs for the plurality of first data items, and a plurality of second output vectors, which are outputs for the plurality of second data items, from the target neural network 102. The plurality of first data items and the plurality of first output vectors correspond to each other in a one-to-one relationship. The plurality of second data items and the plurality of second output vectors correspond to each other in a one-to-one relationship. The transfer learning apparatus 10 generates a first relation vector corresponding to the first label by using the plurality of first output vectors and also generates a second relation vector corresponding to the second label by using the plurality of second output vectors. Here, the first relation vector and the second relation vector are also referred to as identification data that is used to identifying data by using the target neural network 102.

Here, for example, the transfer learning apparatus 10 generates an average vector of the plurality of first output vectors as the first relation vector and generates an average vector of the plurality of second output vectors as the second relation vector. An average vector of a plurality of vectors $[x11, \ldots, xn1], \ldots, [x1i, \ldots, xni], \ldots, [x1k, \ldots, xnk]$ is $[(x11+ \ldots +x1i+ \ldots x1k)/k, \ldots, (xn1+ \ldots +xni+ \ldots xnk)/k]$.

It is assumed that a first output vector is output from the target neural network 102 when a first data item corresponding to a first label is input to the target neural network 102 and that a second output vector is output from the target neural network 102 when a second data item corresponding to a second label is input to the target neural network 102. In this case, the distance between the first output vector and the first relation vector is less than the distance between the first output vector and the second relation vector, and the distance between the second output vector and the second relation vector is less than the distance between the second output vector and the first relation vector.

In this embodiment, the transfer learning apparatus 10 includes a relation vector generating section 101 and the target neural network 102 as illustrated in FIG. 5.

The target neural network 102 includes the structure information holder 104, the weight holder 105, and a data computing section 103.

The structure information holder 104 is a memory, for example, and holds structure information representing the structure of the target neural network 102. The structure information represents the number of layers constituting the target neural network 102, and the numbers of input units, hidden units, and output units arranged in respective layers. The weight holder 105 is a memory, for example, and holds weights W representing weighting values that are used for weighted sum computation performed in the hidden units and output units constituting the target neural network 102. The data computing section 103 performs weighted sum computation by using a target neural network constituted in accordance with the arrangement of input units, hidden units, and output units represented by the structure information held in the structure information holder 104, and weighting values represented by the weights W. That is, the data computing section 103 calculates the weighted sum in each unit when input data X is given to an input unit.

In other words, the transfer learning apparatus 10 obtains a plurality of target learning data items from the target learning data holder 30 and inputs the data items to the target neural network 102 that has the structure information and weighting values of the source neural network generated by the source neural network generating section 21. Subsequently, the transfer learning apparatus 10 obtains, from the target neural network 102, an output vector composed of output values output from the individual output units through calculation of weighted sums in individual units, and inputs the output vector to the relation vector generating section 101. Each of the plurality of target learning data items is attached with one or more answer labels different from an answer label of source learning data.

The relation vector generating section 101 generates relation vectors corresponding to answer labels of the target learning data in a one-to-one relationship, by using output vectors corresponding to the respective target learning data items. In other words, the relation vector generating section 101 generates relation vectors so that the output vectors of the target learning data items input to the target neural network 102 constituted by using the source neural network are associated with the answer labels of the target learning data items in a one-to-one relationship.

As described above, the transfer learning apparatus 10 uses as-is, for the target neural network 102, the structure information and weighting values of the source neural network that has learned by using source learning data. Also, the transfer learning apparatus 10 calculates relation vectors that allow the output vectors of the individual target learning data items input to the target neural network 102 and the answer labels of the target learning data items to correspond to each other in a one-to-one relationship. With use of the calculated relation vectors, the transfer learning apparatus 10 is able to perform transfer learning to adapt the target neural network 102 constituted by using the source neural network as-is to target learning data.

Configuration of Identifying Apparatus 20

Figure 6:
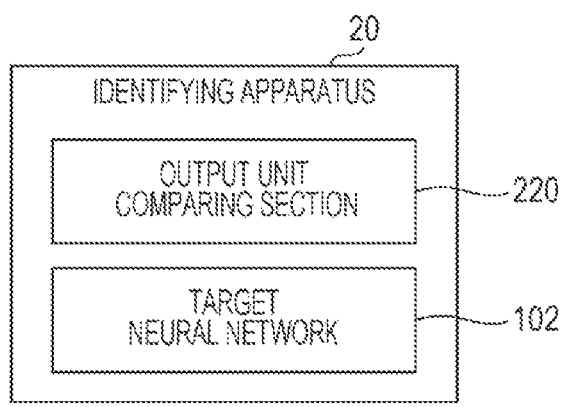
FIG. 6 is a block diagram illustrating an example of a functional configuration of an identifying apparatus according to the first embodiment.

FIG. 6 is a block diagram illustrating an example of a functional configuration of the identifying apparatus 20 according to the first embodiment.

The identifying apparatus 20 is an example of an identifying apparatus including, for example, at least one second circuit. The individual elements of the identifying apparatus 20 may be implemented as software functions that are executed through execution of a predetermined program by an image processor and/or microprocessor, or may be implemented by the second circuit, for example.

The identifying apparatus 20 obtains a first relation vector and a second relation vector from the transfer learning apparatus 10 and obtains test data, which is data without a label and of a type identical to the target learning data, from the data input section 40. The identifying apparatus 20 inputs the obtained test data to the target neural network 102 and obtains an output vector, which is an output for the test data.

The identifying apparatus 20 calculates a first distance, which is a distance between the obtained output vector and the first relation vector, and a second distance, which is a distance between the obtained output vector and the second relation vector. The first distance corresponds to the first relation vector, and the second distance corresponds to the second relation vector. The relation vector corresponding to the shorter one of the first distance and the second distance is selected from among the first relation vector and the second relation vector. A label corresponding to the selected relation vector is selected from among a first label and a second label and outputs the selected label as an answer label for the test data. The first relation vector corresponds to the first label, and the second relation vector corresponds to the second label.

In this embodiment, the identifying apparatus 20 includes an output unit comparing section 220 and the target neural network 102, as illustrated in FIG. 6. The target neural network 102 is obtained from the transfer learning apparatus 10 and includes the structure information holder 104, the weight holder 105, and the data computing section 103. The details have been described above and thus the description thereof is omitted here.

The output unit comparing section 220 obtains an output vector calculated through weighted sum computation of the output units performed by the data computing section 103 and relation vectors generated by the relation vector generating section 101, and compares these vectors with each other. As a result of comparison, the output unit comparing section 220 outputs an answer label of a target learning data item corresponding to the relation vector closest to the value of the output vector. The answer label is output as an output vector for the test data input by the data input section 40. For example, the output unit comparing section 220 outputs, as an output vector for the input test data, an answer label of a target learning data item corresponding to the relation vector in which the value of (output vector Y−relation vector R)×(output vector Y−relation vector R) is the smallest.

The identifying apparatus 20 does not necessarily include the target neural network 102, and may share the target neural network 102 in the transfer learning apparatus 10.

Figure 7:
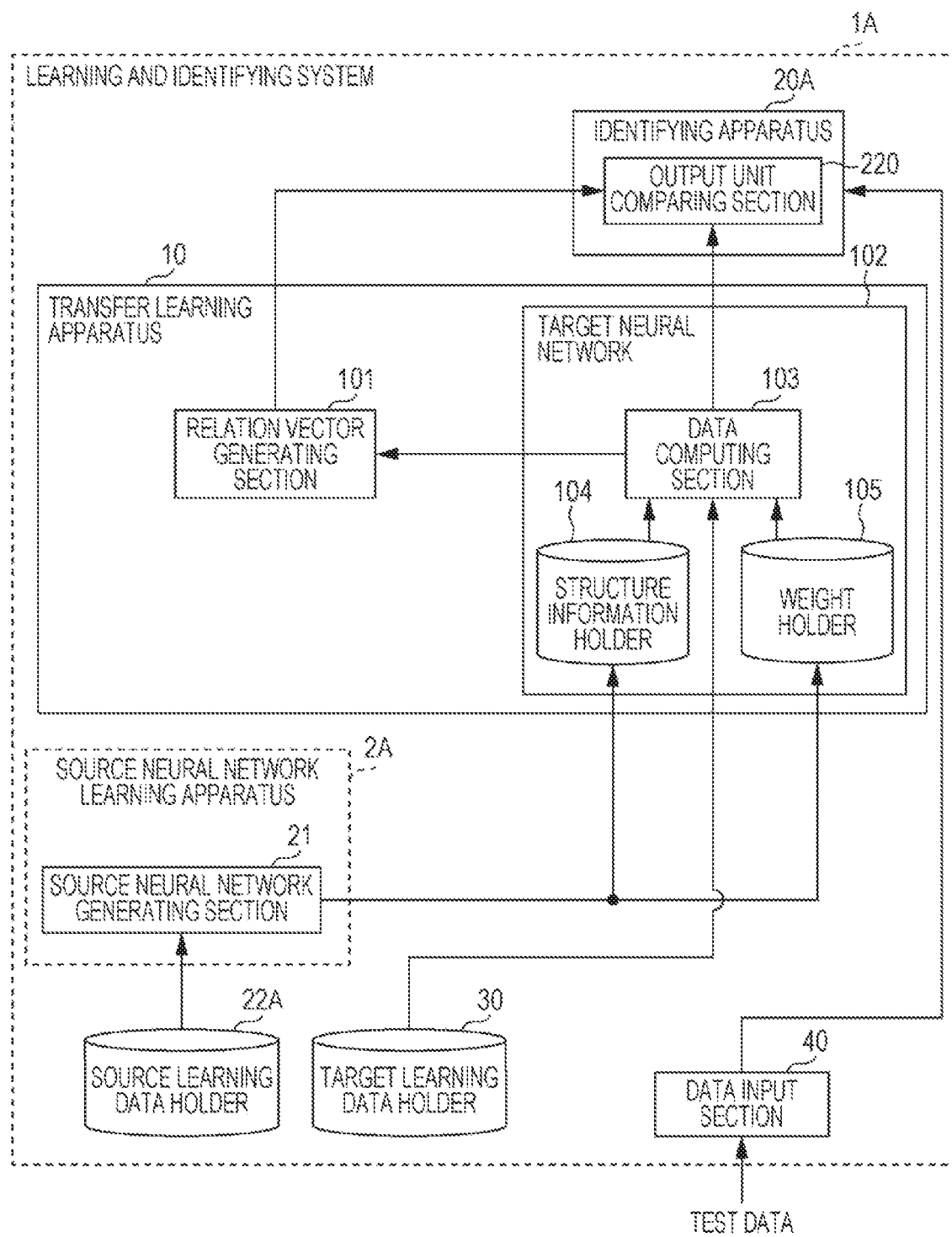
FIG. 7 is a block diagram illustrating another example of a functional configuration of a learning and identifying system according to the first embodiment.

FIG. 7 is a block diagram illustrating an example of a functional configuration of a learning and identifying system 1A according to the first embodiment. The learning and identifying system 1A illustrated in FIG. 7 is different from the learning and identifying system 1 illustrated in FIG. 3 in the configurations of a source neural network learning apparatus 2A, an identifying apparatus 20A, and a source learning data holder 22A. More specifically, the source neural network learning apparatus 2A does not include the source learning data holder 22, and the learning and identifying system 1A includes the source learning data holder 22A. The identifying apparatus 20A does not include the target neural network 102 and shares the target neural network 102 in the transfer learning apparatus 10. The details have been described above, and thus the description thereof is omitted here.

Operation of Learning and Identifying System 1

Now, an example of an operation of the learning and identifying system 1 having the above-described configuration will be described.

First, transfer learning will be described with reference to FIGS. 8 to 11B, and then an identification process will be described with reference to FIG. 12.

Transfer Learning

Figure 8:
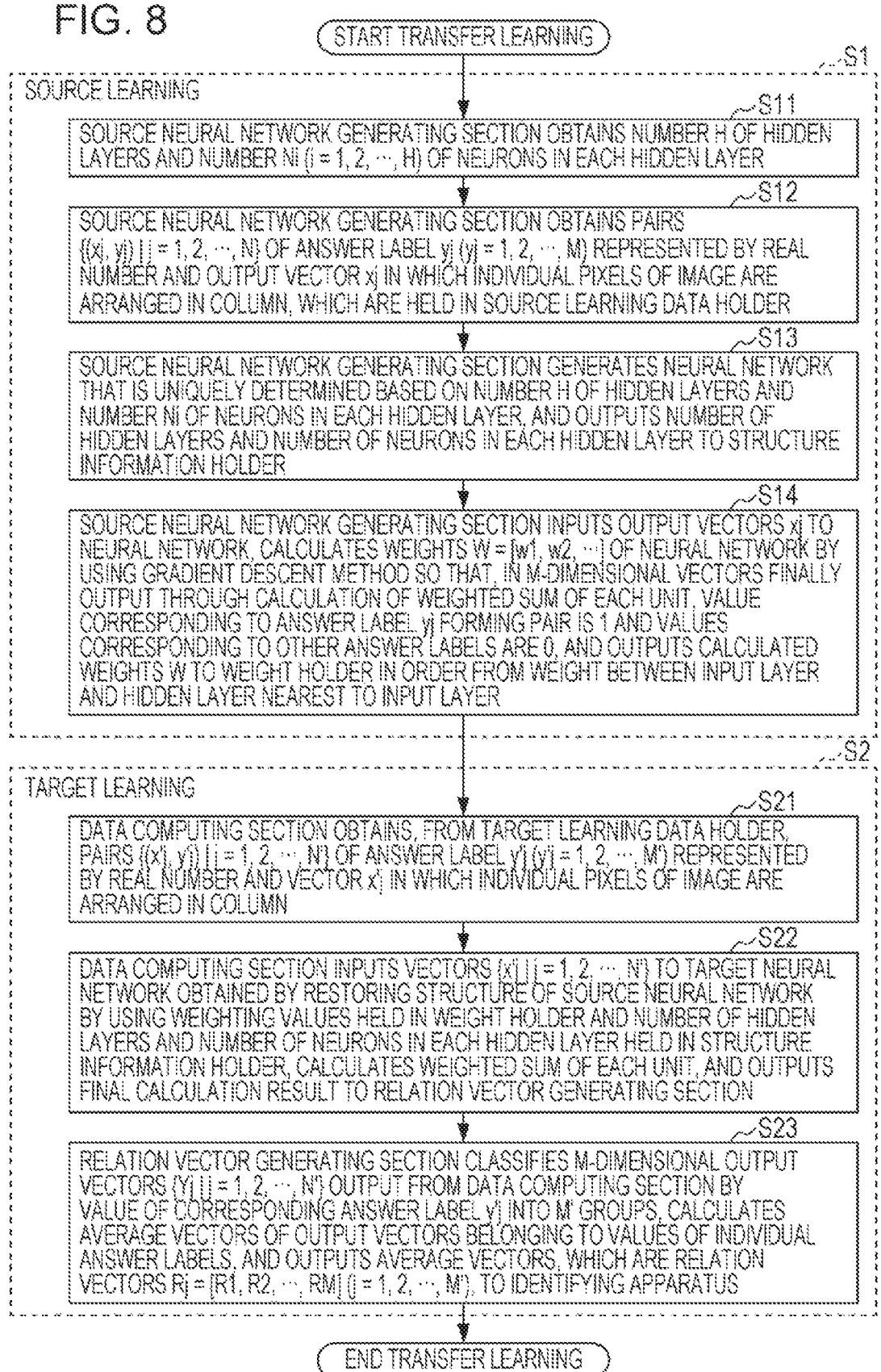
FIG. 8 is a flowchart illustrating an example of transfer learning performed in the learning and identifying system according to the first embodiment.

FIG. 8 is a flowchart illustrating an example of transfer learning performed in the learning and identifying system 1 according to the first embodiment.

First, the source neural network learning apparatus 2 performs source learning (S1).

The source neural network generating section 21 obtains a number H of hidden layers and a number Ni (i=1, 2, . . . , H) of neurons in each hidden layer (S11).

Subsequently, the source neural network generating section 21 obtains a plurality of pairs {(xj, yj)|j=1, 2, . . . , N} of an answer label yj (yj=1, 2, . . . , M) represented by a real number and an output vector xj in which individual pixels of an image are arranged in a column, which are held in the source learning data holder 22 (S12).

Subsequently, the source neural network generating section 21 generates a neural network that is uniquely determined based on the number H of hidden layers and the number Ni of neurons in each hidden layer, and outputs the number of hidden layers and the number of neurons in each hidden layer to the structure information holder 104 (S13).

Subsequently, the source neural network generating section 21 inputs the individual output vectors xj to the neural network and calculates the values of weights W=[w1, w2, . . . ,] of the neural network. The weighting values are calculated by using the gradient descent method so that, in M-dimensional vectors finally output through calculation of the weighted sum of each unit, the value corresponding to the answer label yj forming a pair is 1 and the values corresponding to the other answer labels are 0. The source neural network generating section 21 outputs the calculated weights W to the weight holder 105 in order from a weight between the input layer and the hidden layer nearest to the input layer (S14).

Subsequently, the transfer learning apparatus 10 of the learning and identifying system 1 performs target learning (S2).

The data computing section 103 obtains, from the target learning data holder 30, a plurality of pairs {(x'j, y'j)|j=1, 2, . . . , N'} of an answer label y'j (y'j=1, 2, . . . , M') represented by a real number and a vector x'j in which individual pixels of an image are arranged in a column (S21).

Subsequently, the data computing section 103 inputs a plurality of vectors {x'j|j=1, 2, . . . , N'} to the target neural network 102 obtained by restoring the structure of the source neural network by using the weighting values held in the weight holder 105 and the number of hidden layers and the number of neurons in each hidden layer held in the structure information holder 104, calculates the weighted sum of each unit, and outputs a final calculation result, that is, a plurality of M-dimensional output vectors {Yj|j=1, 2, . . . , N'}, to the relation vector generating section 101 (S22). The vectors x'j in which individual pixels of an image are arranged in a column and the output vectors Yj (j=1, 2, . . . , N') correspond to each other in a one-to-one relationship.

Subsequently, the relation vector generating section 101 classifies the plurality of M-dimensional output vectors {Yj|j=1, 2, . . . , N'} output from the data computing section 103 by the value of the corresponding answer label y'j. That is, the plurality of M-dimensional output vectors are classified into M' groups, M' being the number of types of values of answer labels. Subsequently, the relation vector generating section 101 calculates average vectors of output vectors belonging to the values of individual answer labels, and outputs the average vectors, which are relation vectors Rj=[R1, R2, . . . , RM] (j=1, 2, . . . , M'), to the identifying apparatus 20 (S23).

Figure 9:
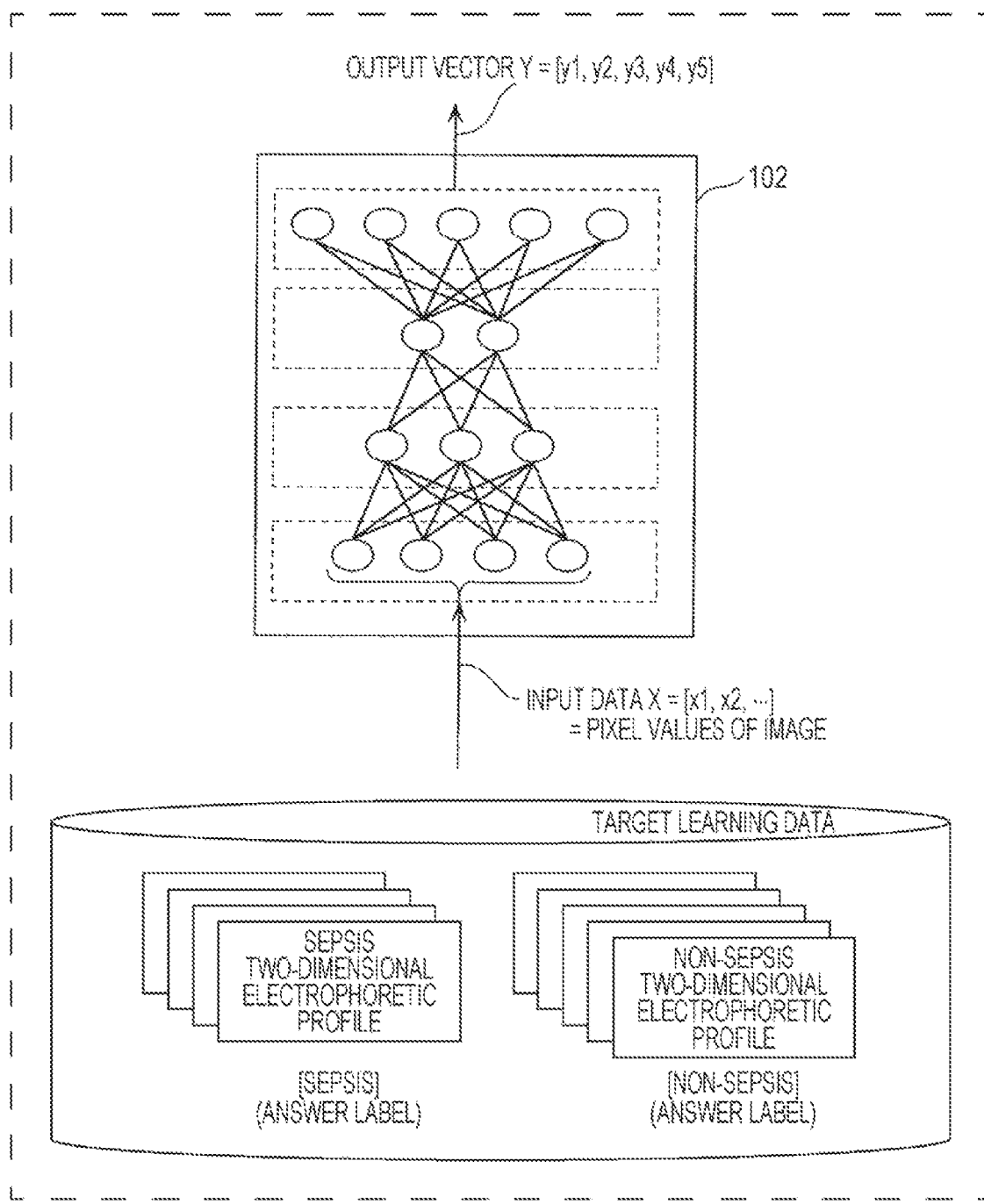
FIG. 9 is a diagram illustrating an example of transfer learning performed in the transfer learning apparatus according to the first embodiment.
Figure 10:
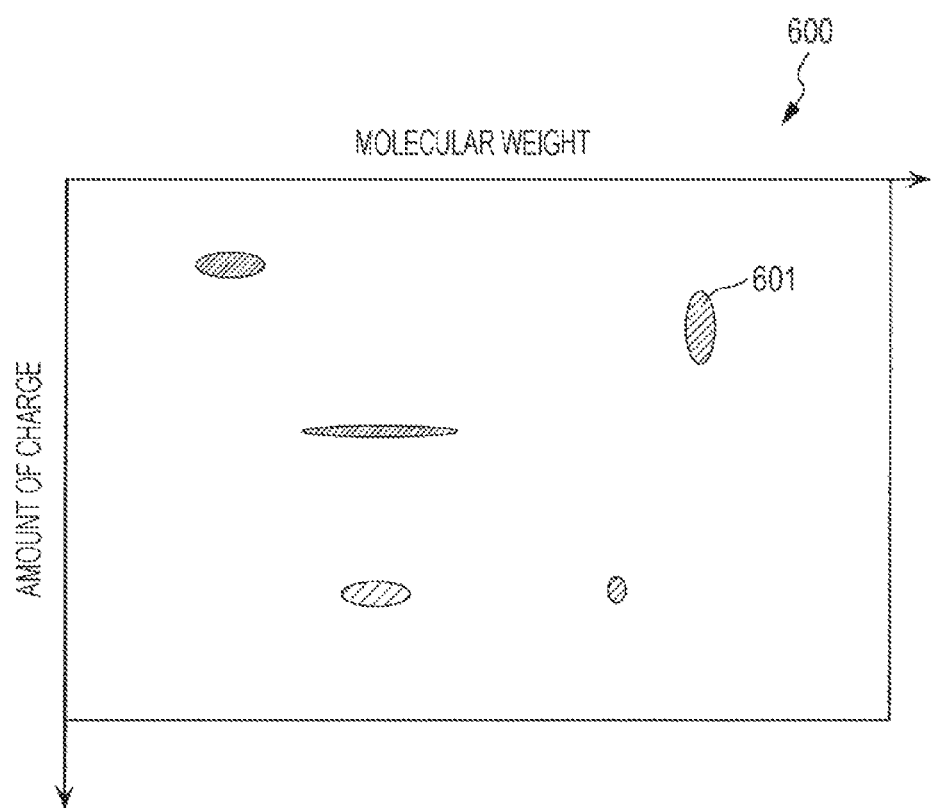
FIG. 10 is a schematic diagram of a two-dimensional electrophoretic profile.

FIG. 9 is a diagram illustrating an example of transfer learning performed in the transfer learning apparatus 10 according to the first embodiment. FIG. 10 is a schematic diagram of a two-dimensional electrophoretic profile.

In the example illustrated in FIG. 9, target learning data includes images of a plurality of two-dimensional electrophoretic profiles. The answer labels "sepsis" and "non-sepsis" are attached to the individual images.

The two-dimensional electrophoretic profile 600 illustrated in FIG. 10 is an image obtained by two-dimensionally separating proteins on the basis of an amount of charge and a molecular weight. With the two-dimensional electrophoretic profile 600, the condition of a patient can be grasped by referring to the position or density (pixel value) of a protein 601 in the image. Sepsis is a kind of systemic inflammatory response syndrome (SIRS) and is regarded as a disease that needs to be detected in an early stage in medical practice. It is difficult to collect many images of two-dimensional electrophoretic profiles of sepsis patients. Thus, images of two-dimensional electrophoretic profiles of sepsis patients correspond to relatively small learning data that does not allow sufficient learning.

In the example illustrated in FIG. 9, transfer learning to identify the two-dimensional electrophoretic profile 600 is performed in the transfer learning apparatus 10. Accordingly, the identifying apparatus 20 is able to accurately identify sepsis and non-sepsis.

More specifically, in the transfer learning apparatus 10, the target neural network 102 uses as-is the structure information and weights W of the source neural network that has learned by using source learning data. Every time target learning data is input, the target neural network 102 outputs an output vector Y=[y1, y2, y3, y4, y5] composed of output values of individual output units to the relation vector generating section 101.

The relation vector generating section 101 calculates an average value of output vectors Y for each answer label of target learning data, the average value corresponding to a relation vector R. In this way, transfer learning is performed in which the target neural network 102 constituted by using as-is the source neural network is adapted to target learning data.

FIG. 11A is a diagram illustrating an example of a relation vector regarding "sepsis". FIG. 11B is a diagram illustrating an example of a relation vector regarding "non-sepsis".

FIG. 11A illustrates an example of the case of calculating a relation vector R from three output vectors Y when a plurality of sepsis images, for example, three sepsis images, are input as input data X to the target neural network 102 illustrated in FIG. 9. More specifically, the relation vector R illustrated in FIG. 11A is calculated as an average value of values of three output vectors Y 701 to 703, that is, the output values y1, y2, y3, y4, and y5 of the five output units illustrated in FIG. 9. That is, the relation vector generating section 101 calculates a relation vector R1=[(y11+y12+y13)/3, (y21+y22+y23)/3, (y31+y32+y33)/3, (y41+y42+y43)/3, (y51+y52+y53)/3]=[0.01, −0.22, 0.12, 0.43, 0.25] corresponding to an answer label="sepsis", by using Output vector Y 701=[y11, y21, y31, y41, y51]=[0.01, −0.3, 0.1, 0.4, 0.2], Output vector Y 702=[y12, y22, y32, y42, y52]=[−0.01, −0.15, 0.15, 0.55, 0.3], and Output vector Y 703=[y13, y23, y33, y43, y53]=[0.03, −0.2, 0.1, 0.35, 0.25].

On the other hand, FIG. 11B illustrates an example of the case of calculating a relation vector R from three output vectors Y when a plurality of non-sepsis images, for example, three non-sepsis images, are input as input data X to the target neural network 102 illustrated in FIG. 9. More specifically, the relation vector R illustrated in FIG. 11B is calculated as an average value of values of three output vectors Y 704 to 706, that is, the output values y1, y2, y3, y4, and y5 of the five output units illustrated in FIG. 9. That is, the relation vector generating section 101 calculates a relation vector R2=[(y14+y15+y16)/3, (y24+y25+y26)/3, (y34+y35+y36)/3, (y44+y45+y46)/3, (y54+y55+y56)/3]= [0.03, −0.11, 0.12, 0.33, 0.33] corresponding to an answer label="non-sepsis", by using Output vector Y 704=[y14, y24, y34, y44, y54]=[0.22, −0.1, 0.14, 0.2, 0.25], Output vector Y 705=[y15, y25, y35, y45, y55]=[−0.03, −0.1, 0.1, 0.3, 0.35], and Output vector Y 706=[y16, y26, y36, y46, y56]=[0.1, −0.14, 0.12, 0.5, 0.4].

In this embodiment, calculation of the foregoing relation vector R corresponds to transfer learning for adapting to target learning data, as described above.

Identification Process

Figure 12:
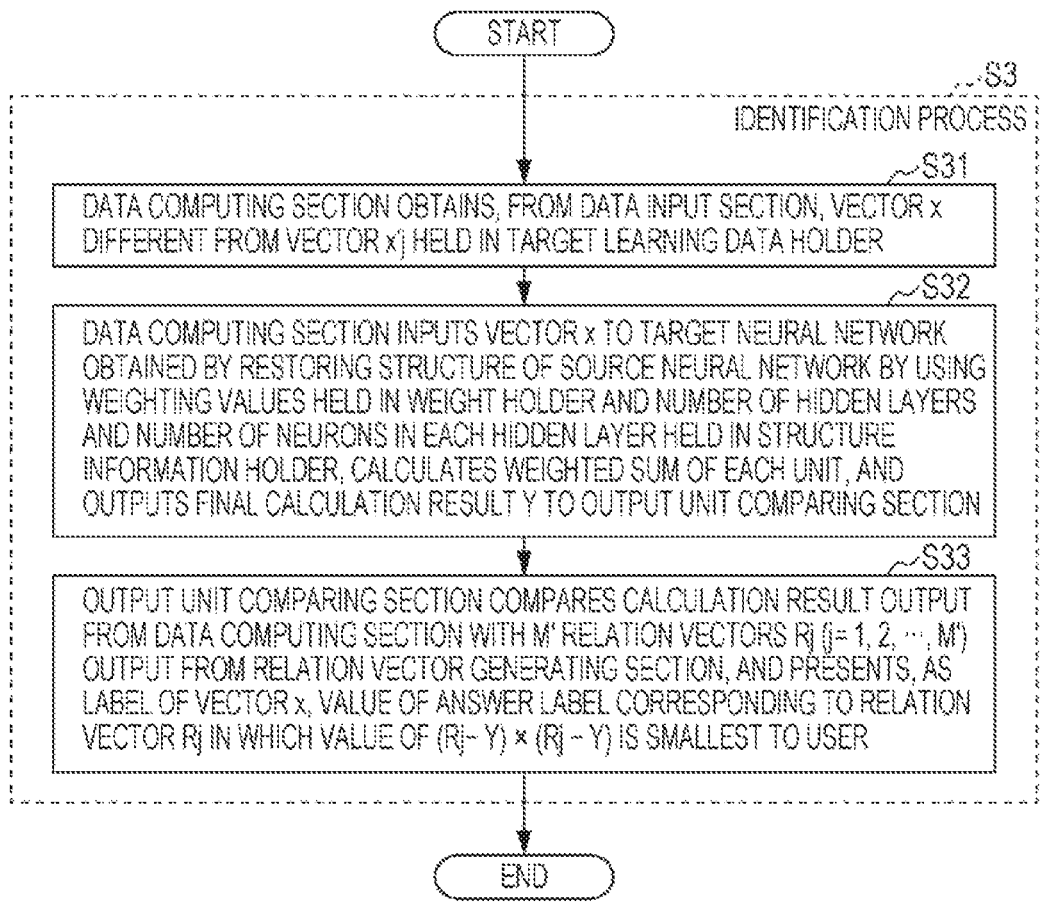
FIG. 12 is a flowchart illustrating an example of an identification process performed in the identifying apparatus according to the first embodiment.

FIG. 12 is a flowchart illustrating an example of an identification process S3 performed in the identifying apparatus 20 according to the first embodiment.

More specifically, the data computing section 103 obtains, from the data input section 40, a vector x different from the vector x'j held in the target learning data holder 30 (S31). Here, the vector x corresponds to test data, for example, and is data without a label and of a type identical to the vector x'j. Here, the identical type may mean that identification targets are in an identical category, the types of identification targets are identical to each other, or the types of identification targets are similar to each other.

Subsequently, the data computing section 103 inputs the vector x to the target neural network obtained by restoring the structure of the source neural network by using the weighting values held in the weight holder 105 and the number of hidden layers and the number of neurons in each hidden layer held in the structure information holder 104, calculates the weighted sum of each unit, and outputs a final calculation result Y to the output unit comparing section 220 (S32).

Subsequently, the output unit comparing section 220 compares the calculation result output from the data computing section 103 with M' relation vectors Rj (j=1, 2, . . . , M') output from the relation vector generating section 101 of the transfer learning apparatus 10, and presents, as the label of the vector x, the value of the answer label corresponding to the relation vector Rj in which the value of (Rj−Y)×(Rj−Y) is the smallest to the user (S33).

For example, it is assumed that the output vector Y is [0.03, −0.2, 0.1, 0.35, 0.25] when a certain two-dimensional electrophoretic profile is identified (classified) by the identifying apparatus 20. In this case, the identifying apparatus 20 outputs "sepsis", which is an answer label corresponding to the nearest relation vector [0.01, −0.22, 0.12, 0.43, 0.25] of the relation vectors [0.01, −0.22, 0.12, 0.43, 0.25] and [0.03, −0.11, 0.12, 0.33, 0.33] regarding "sepsis" and "non-sepsis".

Now, a description will be given by using the example illustrated in FIGS. 9, 11A, and 11B. The data computing section 103 obtains the vector x, which is test data held in the target learning data holder 30. The data computing section 103 performs calculation by using the vector x as test data, and it is assumed that the output vector Y (calculation result) output to the output unit comparing section 220 is [y10, y20, y30, y40, y50]=[0, −0.23, 0.11, 0.42, 0.24].

The output unit comparing section 220 calculates the value of the square of the distance between the relation vector R1=[r11, r21, r31, r41, r51]=[0.01, −0.22, 0.12, 0.43, 0.25] corresponding to an answer label "sepsis" and the output vector Y=[y10, y20, y30, y40, y50]=[0, −0.23, 0.11, 0.42, 0.24]. That is, the output unit comparing section 220 calculates $(y10−r11)^2+(y20−r21)^2+(y30−r31)^2+(y40−r41)^2+(y50−r51)^2=(0−0.01)^2+(−0.23−(−0.22))^2+(0.11−0.12)^2+(0.42−0.43)^2+(0.24−0.25)^2=0.005$.

The output unit comparing section 220 calculates the value of the square of the distance between the relation vector R2=[r12, r22, r32, r42, r52]=[0.03, −0.11, 0.12, 0.33, 0.33] corresponding to an answer label "non-sepsis" and the output vector Y=[y10, y20, y30, y40, y50]=[0, −0.23, 0.11, 0.42, 0.24]. That is, the output unit comparing section 220 calculates $(y10−r12)^2+(y20−r22)^2+(y30−r32)^2+(y40−r42)^2+(y50−r52)^2=(0−0.03)^2+(−0.23−(−0.11))^2+(0.11−0.12)^2+(0.42−0.33)^2+(0.24−0.33)^2=0.0316$.

The output unit comparing section 220 compares 0.005, which is the value of the square of the distance between the relation vector R1 corresponding to the answer label "sepsis" and the output vector Y, with 0.0316, which is the value of the square of the distance between the relation vector R2 corresponding to the answer label "non-sepsis" and the output vector Y, and outputs the answer label "sepsis" corresponding to the value 0.005, which is the smaller value.

The output unit comparing section 220 calculates and compares the values of squares of distances. Alternatively, the output unit comparing section 220 may calculate and compare the distances. That is, the output unit comparing section 220 may compare the distance $(0.005)^{1/2}$ between the relation vector R1 corresponding to the answer label "sepsis" and the output vector Y with the distance $(0.0316)^{1/2}$ between the relation vector R2 corresponding to the answer label "non-sepsis" and the output vector Y, and may output the answer label "sepsis" corresponding to the smaller distance $(0.005)^{1/2}$.

Advantages of First Embodiment

As described above, according to the learning apparatus and the learning and identifying system according to the first embodiment, the structure information and weighting values of a source neural network generated through learning using source learning data are used as-is for a target neural network. Also, relation vectors are calculated that enable output vectors obtained by inputting target learning data items to the target neural network to be associated with answer labels of the target learning data items in a one-to-one relationship. In this way, a learning apparatus and a learning and identifying system are obtained which are capable of performing transfer learning for adapting, to the target learning data, the target neural network that uses the structure information and weighting values of the source neural network as-is.

According to the identifying apparatus according to the first embodiment, in the case of identifying new data items that are of the same type as target learning data and that are not attached with an answer label, an output vector obtained by inputting the new data items is compared with individual relation vectors. The value of the answer label of the target learning data corresponding to the relation vector closest to the output vector is output as a label of the output vector.

Accordingly, a learning apparatus, an identifying apparatus, and a learning and identifying system can be obtained which are free from the time and effort for changing the structure information and weighting values of a source neural network by using target learning data in transfer learning, and which do not have adverse effects of overfitting or decrease in identification accuracy that may result from a change in the structure information and weighting values.

A data formatting process including normalization, threshold process, noise reduction, and data size unification may be performed on the data input to the source neural network learning apparatus 2 and the transfer learning apparatus 10. Normalization may be performed on answer vectors as well as input data. The data formatting process may be performed by either the source neural network learning apparatus 2 or the transfer learning apparatus 10. With the data formatting process being performed, highly consistent transfer learning from source learning data to target learning data can be performed.

Second Embodiment

In the first embodiment, a description has been given of the transfer learning and identification process of a target neural network in which the structure information and weights W of a source neural network that has learned by using source learning data are used as-is. However, the present disclosure is not limited thereto. The weights W that are used as-is in the target neural network may be updated. Hereinafter, this case will be described as a second embodiment. The description will be given mainly of a difference from the first embodiment.

Configuration of Transfer Learning Apparatus 10B

Figure 13:
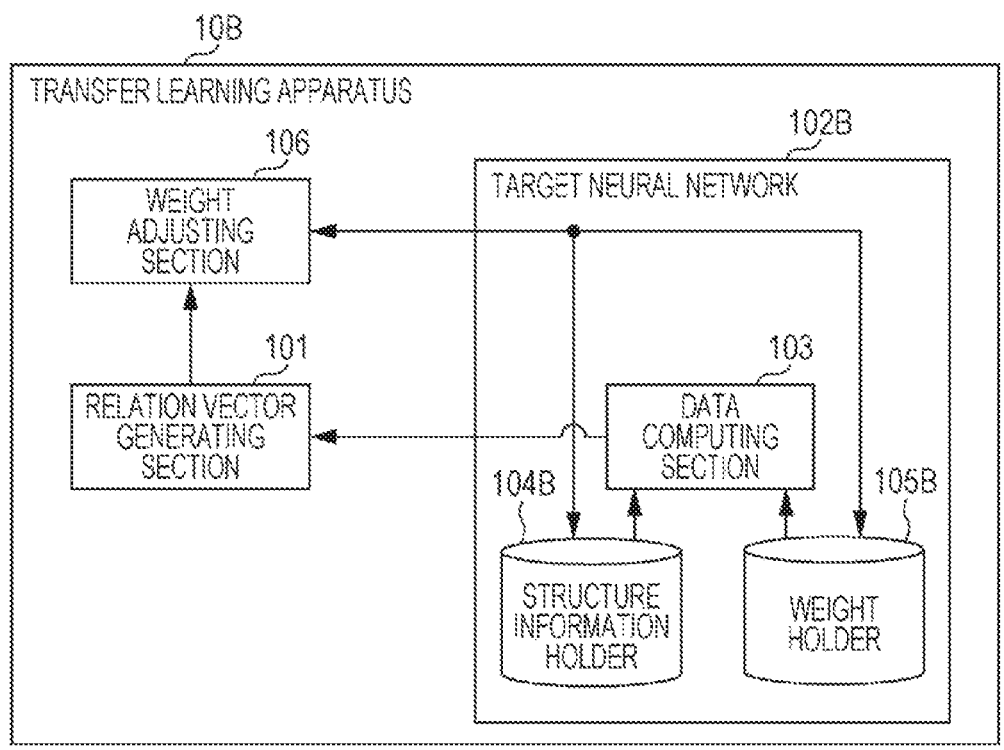
FIG. 13 is a block diagram illustrating an example of a functional configuration of a transfer learning apparatus according to a second embodiment.

FIG. 13 is a block diagram illustrating an example of a functional configuration of a transfer learning apparatus 10B according to the second embodiment. The same elements as those in FIG. 5 are denoted by the same reference numerals, and the detailed description thereof is omitted.

The transfer learning apparatus 10B illustrated in FIG. 13 is different from the transfer learning apparatus 10 according to the first embodiment in that a weight adjusting section 106 is included and that a target neural network 102B is included instead of the target neural network 102.

The weight adjusting section 106 updates the weight information on the target neural network 102B by using a first relation vector and a second relation vector. More specifically, the weight adjusting section 106 updates the weight information by performing learning in which a plurality of first output vectors that are outputs for a plurality of first data items take the first relation vector as an answer and a plurality of second output vectors that are outputs for a plurality of second data items take the second relation vector as an answer.

In this embodiment, the transfer learning apparatus 10B updates the weighting values held in a weight holder 105B through supervised learning, with the weighting values of a source neural network that has learned by using source learning data being used as initial values, and with the relation vectors generated by the relation vector generating section 101 being an answer (supervisor). For example, the transfer learning apparatus 10B regards an answer vector Z of target learning data as a corresponding relation vector R. The transfer learning apparatus 10B adjusts the weights W through learning so that, when a plurality of input data items X are input, values close to the values of the answer vector Z corresponding to the input data items X (values of corresponding relation vectors R) are output as output values of individual output units.

As described above, the learning and identifying system according to the second embodiment has a function of updating the weighting values of a target neural network in addition to a function of calculating relation vectors described above in the first embodiment. The weighting values of the target neural network are updated through supervised learning performed by using target learning data, with the weighting values of a source neural network that has learned by using a plurality of source learning data items being initial values.

Operation of Transfer Learning Apparatus 10B

Next, a description will be given of an operation of the transfer learning apparatus 10B having the above-described configuration.

Figure 14:
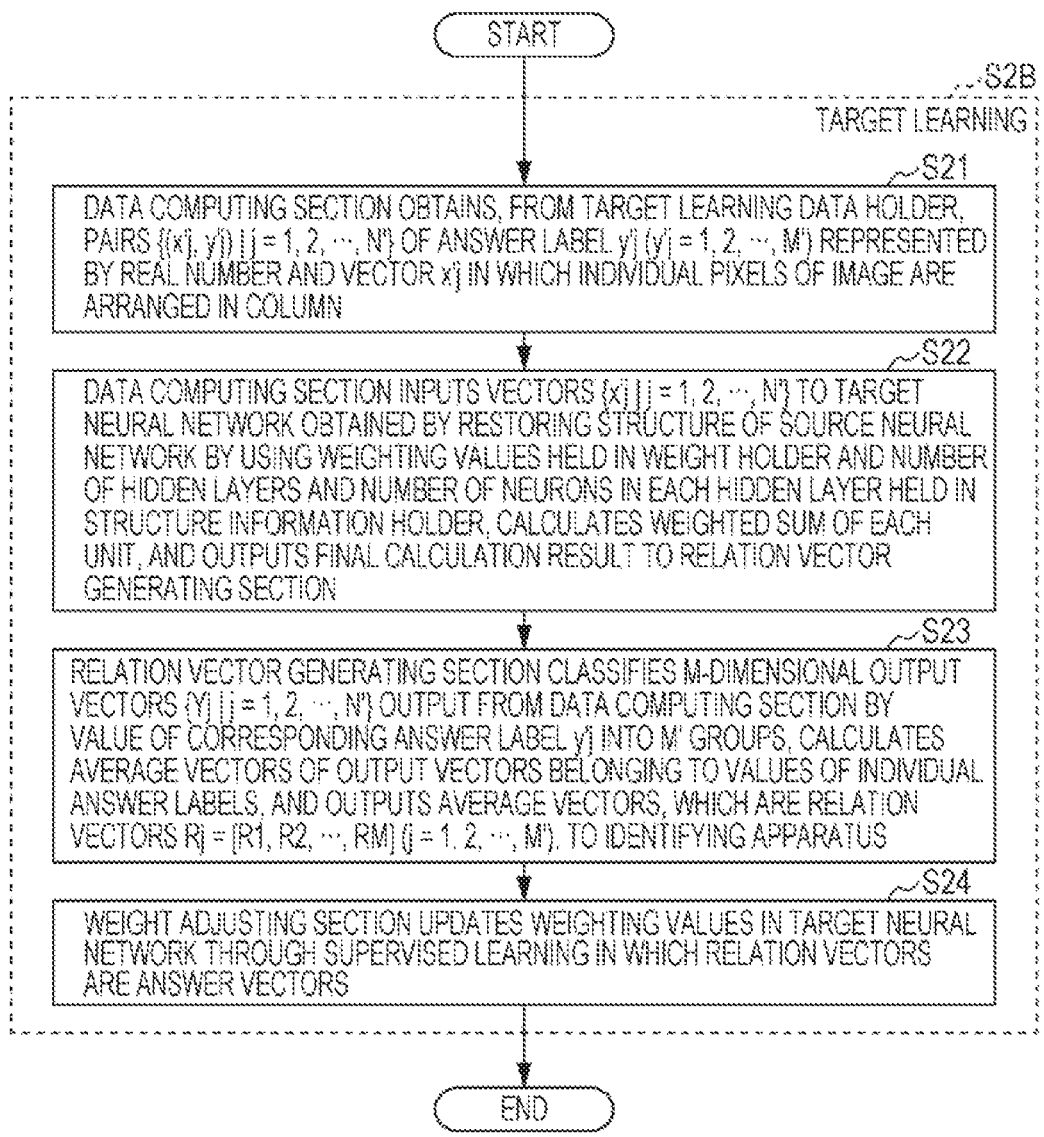
FIG. 14 is a flowchart illustrating an example of transfer learning performed in the transfer learning apparatus according to the second embodiment.

FIG. 14 is a flowchart illustrating an example of transfer learning performed in the transfer learning apparatus 10B according to the second embodiment. The same steps as those in FIG. 8 are denoted by the same reference symbols, and the detailed description thereof is omitted.

First, in the transfer learning apparatus 10B, relation vectors are calculated in steps S21 to S23. Steps S21 to S23 have been described above and thus the description thereof is omitted.

Subsequently, the weight adjusting section 106 updates the weighting values in a target neural network through supervised learning in which relation vectors are answers (S24).

More specifically, the weight adjusting section 106 obtains a plurality of target learning data items, which are learning data items with answer labels, from the target learning data holder 30. Subsequently, the weight adjusting section 106 updates the weighting values in the target neural network 102B through supervised learning in which relation vectors corresponding to the individual target learning data items are answer vectors, with the weighting values in a source neural network that has learned by using a plurality of source learning data items being initial values.

In other words, the weight adjusting section 106 updates the weights W of the target neural network 102B so that the values of answer vectors Z assigned to individual answer labels are close to the values of output vectors Y. For example, the weight adjusting section 106 updates the weights W of the target neural network 102B so that the value of an error $L1=(Y1-Z1)\times(Y1-Z1)$ between the output vector Y1 of the target learning data "sepsis" and the answer vector Z1 of "sepsis" is small. Also, for example, the weight adjusting section 106 updates the weights W of the target neural network 102B so that the value of an error $L2=(Y2-Z2)\times(Y2-Z2)$ between the output vector Y2 of the target learning data "non-sepsis" and the answer vector Z2 of "non-sepsis" is small.

As described above, in the case of performing supervised learning on the target neural network 102B, for example, a loss function (L1 or L2) representing an error between the answer vector Z and the output vector Y may be defined by using input data X, weights W, and answer labels (for example, $L=|Y-Z|$, || represents an absolute value), and the weights W may be updated along a gradient for decreasing the loss function by using the gradient descent method or back propagation.

As in the first embodiment, a data formatting process including normalization, threshold process, noise reduction, and data size unification may be performed on the data input to the source neural network learning apparatus 2 and the transfer learning apparatus 10B. Normalization may be performed on answer vectors as well as input data. The data formatting process may be performed by either the source neural network learning apparatus 2 or the transfer learning apparatus 10B.

Advantages of Second Embodiment

As described above, according to the learning apparatus and the learning and identifying system according to the second embodiment, the weighting values of a target neural network are updated through supervised learning using target learning data, with the weighting values of a source neural network that has learned by using source learning data being initial values. Accordingly, overfitting that may occur in the case of not using as-is the weighting values of the source neural network that has learned and in the case of learning by using a small amount of target learning data can be suppressed.

The weight adjusting section 106 may perform learning by using target learning data, with the weighting values of all units of the target neural network 102B being the target to be updated. Accordingly, for example, in a case where the target neural network 102B is a multilayer neural network, a decrease in identification accuracy that may occur when the weighting values of some of the units of the target neural network 102B are updated and the weighting values of the other units are not updated, for example, when the weighting values of the units in an upper layer are updated and the weighting values of the units in the other layers are not updated.

Third Embodiment

In the first embodiment, a description has been given of generating relation vectors corresponding to answer labels of target learning data in a one-to-one relationship by using output vectors corresponding to target learning data. However, if the values of generated relation vectors are close to each other (if the distance therebetween is short), the identification accuracy may decrease. Thus, the values of relation vectors may be adjusted so as to increase the difference between the relation vectors. Hereinafter, this case will be described as a third embodiment. The description will be given mainly of a difference from the first embodiment.

Configuration of Transfer Learning Apparatus 10C

Figure 15:
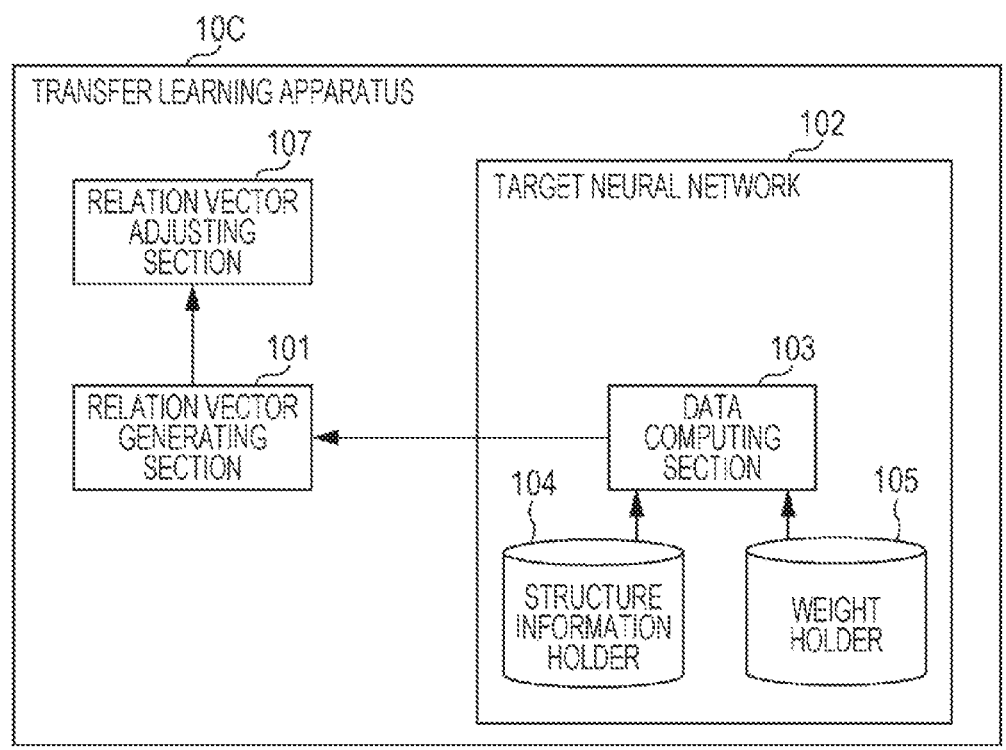
FIG. 15 is a block diagram illustrating an example of a functional configuration of a transfer learning apparatus according to a third embodiment.

FIG. 15 is a block diagram illustrating an example of a functional configuration of a transfer learning apparatus 10C according to the third embodiment. The same elements as those in FIG. 5 are denoted by the same reference numerals, and the detailed description thereof is omitted.

The transfer learning apparatus 10C illustrated in FIG. 15 is different from the transfer learning apparatus 10 according to the first embodiment in that a relation vector adjusting section 107 is included.

The relation vector adjusting section 107 adjusts the value of a first relation vector and the value of a second relation vector so that the value of the first relation vector is within a range of a constant multiple of a first standard deviation calculated from a plurality of first output vectors, that the value of the second relation vector is within a range of a constant multiple of a second standard deviation calculated from a plurality of second output vectors, and that a difference value between the first relation vector and the second relation vector is large. That is, the relation vector adjusting section 107 adjusts the relation vectors generated by the relation vector generating section 101 so that the difference between the relation vectors increases within a predetermined range.

Operation of Transfer Learning Apparatus 10C

Figure 16:
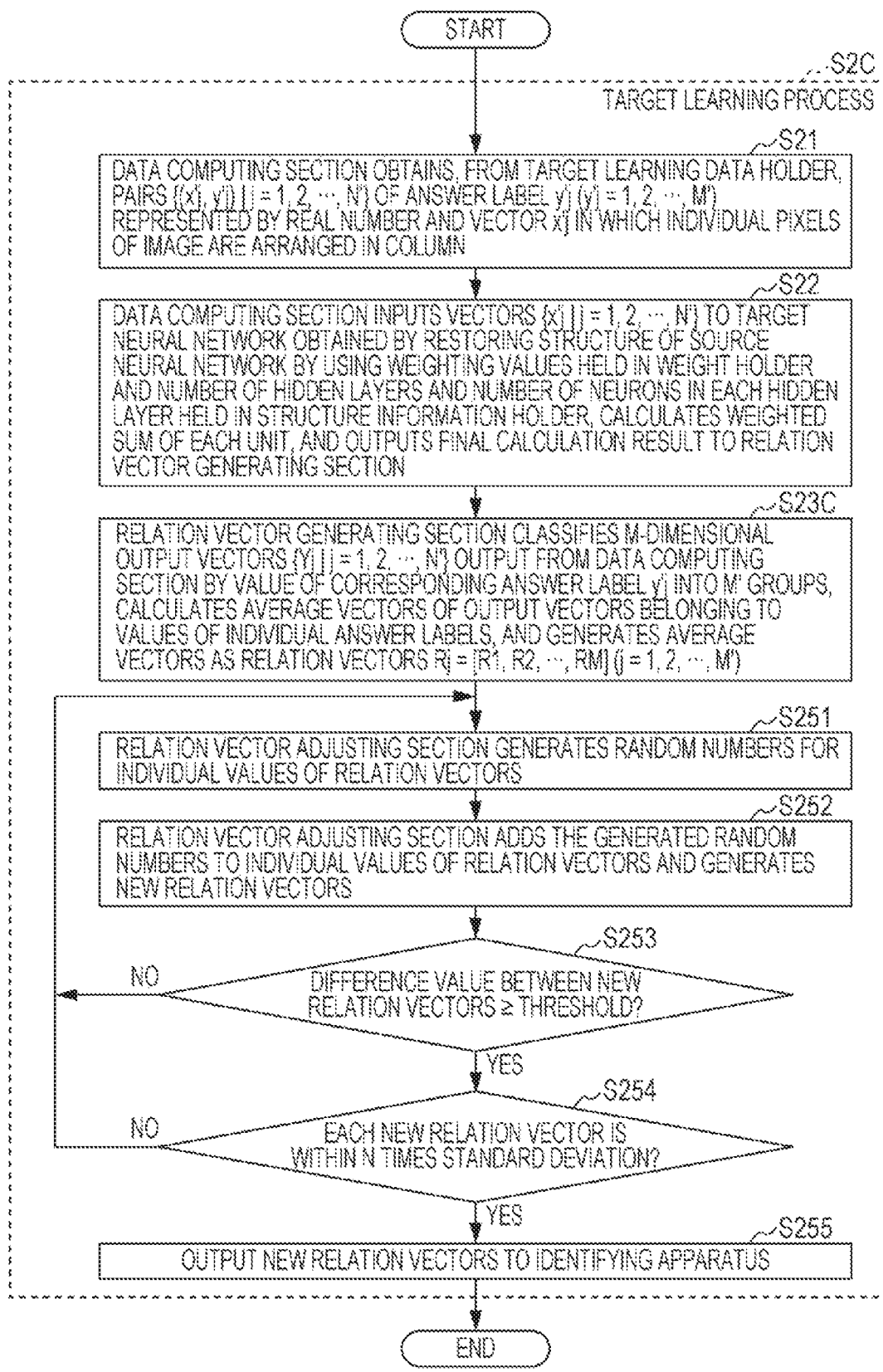
FIG. 16 is a flowchart illustrating an example of an operation of the transfer learning apparatus according to the third embodiment.

Next, an operation of the transfer learning apparatus 10C having the above-described configuration will be described, FIG. 16 is a flowchart illustrating an example of the operation of the transfer learning apparatus 10C according to the third embodiment. The same steps as those in FIG. 8 are denoted by the same reference symbols, and the detailed description thereof is omitted.

First, relation vectors are generated in the transfer learning apparatus 100 in steps S21 to S23C. The difference between step S23C and step S23 in FIG. 8 is as follows. That is, relation vectors Rj that have been generated are output to the identifying apparatus 20 in step S23, whereas relation vectors Rj that have been generated are not output to the identifying apparatus 20 in step S23C.

Subsequently, the relation vector adjusting section 107 generates random numbers Δ for individual values of the generated relation vectors (S251). Here, the random numbers Δ can be generated based on an algorithm according to the related art, such as the Box-Muller method, by using variation matrices of output vectors Y. The variation matrices are calculated for each answer label of target learning data.

Subsequently, the relation vector adjusting section 107 adds the generated random numbers Δ to the individual values of the relation vectors, and thereby generates new relation vectors R'=[r1+Δ1, r2+Δ2, . . . ] (S252).

Subsequently, the relation vector adjusting section 107 determines whether or not a difference value between the new relation vectors is larger than or equal to a threshold $T_H$ (S253). Here, the difference value can be determined based on the Euclidean distance or Mahalanobis distance between the new relation vectors.

If the difference value between the new relation vectors is larger than or equal to the threshold $T_H$ (YES in S253), the process proceeds to step S254. If the difference value between the new relation vectors is smaller than the threshold $T_H$ (NO in S253), the process returns to step S251.

Subsequently, in step S254, the relation vector adjusting section 107 determines whether each of the new relation vectors is within N times the standard deviation of the output vector Y calculated based on the target learning data attached with a corresponding answer label.

If it is determined in step S254 that each of the new relation vectors is within N times the standard deviation of the corresponding output vector Y (YES in S254), the process proceeds to step S255. If each of the new relation vectors is larger than N times the standard deviation of the corresponding output vector Y (NO in S254), the process returns to step S251.

In step S255, the relation vector adjusting section 107 outputs the new relation vectors, instead of the relation vectors generated in step S23C, to the identifying apparatus 20.

Step S254 is a step of determining whether a new relation vector is not added with a random number that cannot be calculated from the output vector Y of the answer label corresponding to the relation vector. In general, N is set to 3 or 5. This means that almost all target learning data items having corresponding answer labels are included, and that a vector outside the range cannot be calculated by using a target learning data item having a corresponding answer label.

Now, an example will be described in which images of a plurality of two-dimensional electrophoretic profiles are used as target learning data, as illustrated in FIG. 9.

Example

For example, it is assumed that a relation vector R1 of "sepsis" is [0.21, 0.03, −0.54, 1.08, −0.04, 0.08, 0.03, 0.13, 0.13, 0.01]. Also, it is assumed that the random numbers generated in step S251 are Δ1=0.02, Δ2=0.1, Δ3=−0.01, Δ4=−0.05, Δ5=0.01, Δ6=0.04, Δ7=0.02, Δ8=0.02, and Δ9=0.02. In this case, the relation vector adjusting section 107 adds the random numbers to the respective values of the relation vector R1, and thereby generates a new relation vector R1'=[0.23, 0.13, −0.55, 1.03, −0.03, 0.12, 0.05, 0.15, 0.03] in step S252.

For example, it is assumed that a relation vector R2 of "non-sepsis" is [0.16, 0.03, 0.0, 0.27, 0.07, 0.04, 0.14, 0.15, 0.13]. Also, it is assumed that the random numbers generated in step S251 are Δ1=0.0, Δ2=0.01, Δ3=0.01, Δ4=0.05, Δ5=−0.03, Δ6=0.06, Δ7=−0.04, Δ8=−0.01, and α9=−0.10. In this case, the relation vector adjusting section 107 adds the random numbers to the respective values of the relation vector R2, and thereby generates a new relation vector R2'=[0.16, 0.04, 0.01, 0.32, 0.04, 0.1, 0.1, 0.14, 0.03] in step S252.

Subsequently, in step S253, the relation vector adjusting section 107 calculates a Euclidean distance d, which is a difference value between the new relation vector R1' and the new relation vector R2'. The Euclidean distance d is 0.91. Here, if the threshold $T_H$ is the Euclidean distance before the random numbers are added, the threshold $T_H$ is 1.01. Thus, the relation vector adjusting section 107 discards the new relation vector R1' and the new relation vector R2' obtained by adding random numbers, and the process returns to step S251.

Subsequently, in step S251, the relation vector adjusting section 107 generates the random numbers of "sepsis", for example, Δ1=−0.01, Δ2=−0.03, Δ3=0.03, Δ4=0.07, Δ5=−0.05, Δ6=0.01, Δ7=0.04, Δ8=0.02, and Δ9=0.02. In this case, in step S252, the relation vector adjusting section 107 adds the generated random numbers to the respective values of the relation vector R1 to generate a new relation vector R1'=[0.20, 0.0, −0.51, 1.15, −0.09, 0.10, −0.07, 0.03, 0.0].

Also, in step S251, the relation vector adjusting section 107 generates the random numbers of "non-sepsis", for example, Δ1=0.02, Δ2=0.01, Δ3=−0.07, Δ4=−0.13, Δ5=0.02, Δ6=−0.02, Δ7=0.15, Δ8=0.2, and Δ9=0.1. In this case, in step S252, the relation vector adjusting section 107 adds the generated random numbers to the respective values of the relation vector R2 to generate a new relation vector R2'=[0.18, 0.04, −0.07, 0.14, 0.09, 0.02, 0.15, 0.20, 0.10].

Subsequently, in step S253, the relation vector adjusting section 107 calculates a Euclidean distance d, which is a difference value between the new relation vector R1' and the new relation vector R2'. The Euclidean distance d is 1.21. The Euclidean distanced 1.21 is larger than or equal to the foregoing threshold $T_H$, and thus the process proceeds to step S254. In step S254, the relation vector adjusting section 107 determines whether each of the new relation vector R1'=[0.20, 0.0, −0.51, 1.15, −0.09, 0.10, −0.07, 0.03, 0.0] and the new relation vector R2'=[0.18, 0.04, −0.07, 0.14, 0.09, 0.02, 0.15, 0.20, 0.10] is within five times the standard deviation calculated from the respective output vectors. If the determination result is affirmative, the relation vector adjusting section 107 outputs the new relation vectors R1' and R2' to the identifying apparatus 20.

Advantages of Third Embodiment

As described above, according to the learning apparatus and the learning and identifying system according to the third embodiment, the values of individual relation vectors generated by the relation vector generating section 101 can be adjusted based on random numbers. If the values of the individual relation vectors generated by the relation vector generating section 101 are close to each other, the identification accuracy may decrease. However, a decrease in the identification accuracy can be suppressed by adjusting the values of the individual generated relation vectors on the basis of random numbers as in this embodiment.

As described above in the first and second embodiments, a data formatting process including normalization, threshold process, noise reduction, and data size unification may be performed on the data input to the source neural network learning apparatus 2 and the transfer learning apparatus 10C. Normalization may be performed on answer vectors as well as input data. The data formatting process may be performed by either the source neural network learning apparatus 2 or the transfer learning apparatus 10C.

The learning apparatus and the learning and identifying system according to the third embodiment may further include the weight adjusting section described above in the second embodiment. With this configuration, as a result of performing supervised learning by using target learning data and by using relation vectors as answer vectors, weighting values in a target neural network can be updated, with weighting values in a source neural network that has learned being initial values. Accordingly, the weighting values in the source neural network that has learned are not used as-is but are optimized, and thus overfitting that may occur in the case of performing learning by using a small amount of target learning data can be suppressed.

After weighting values have been updated on the basis of relation vectors generated by the relation vector adjusting section, the relation vector generating section may generate relation vectors on the basis of the updated weighting values. The weighting values are further updated on the basis of the relation vectors generated by the relation vector adjusting section. Accordingly, the weighting values are changed step by step, and thus a difference between the relation vectors can be increased naturally.

Figure 22:
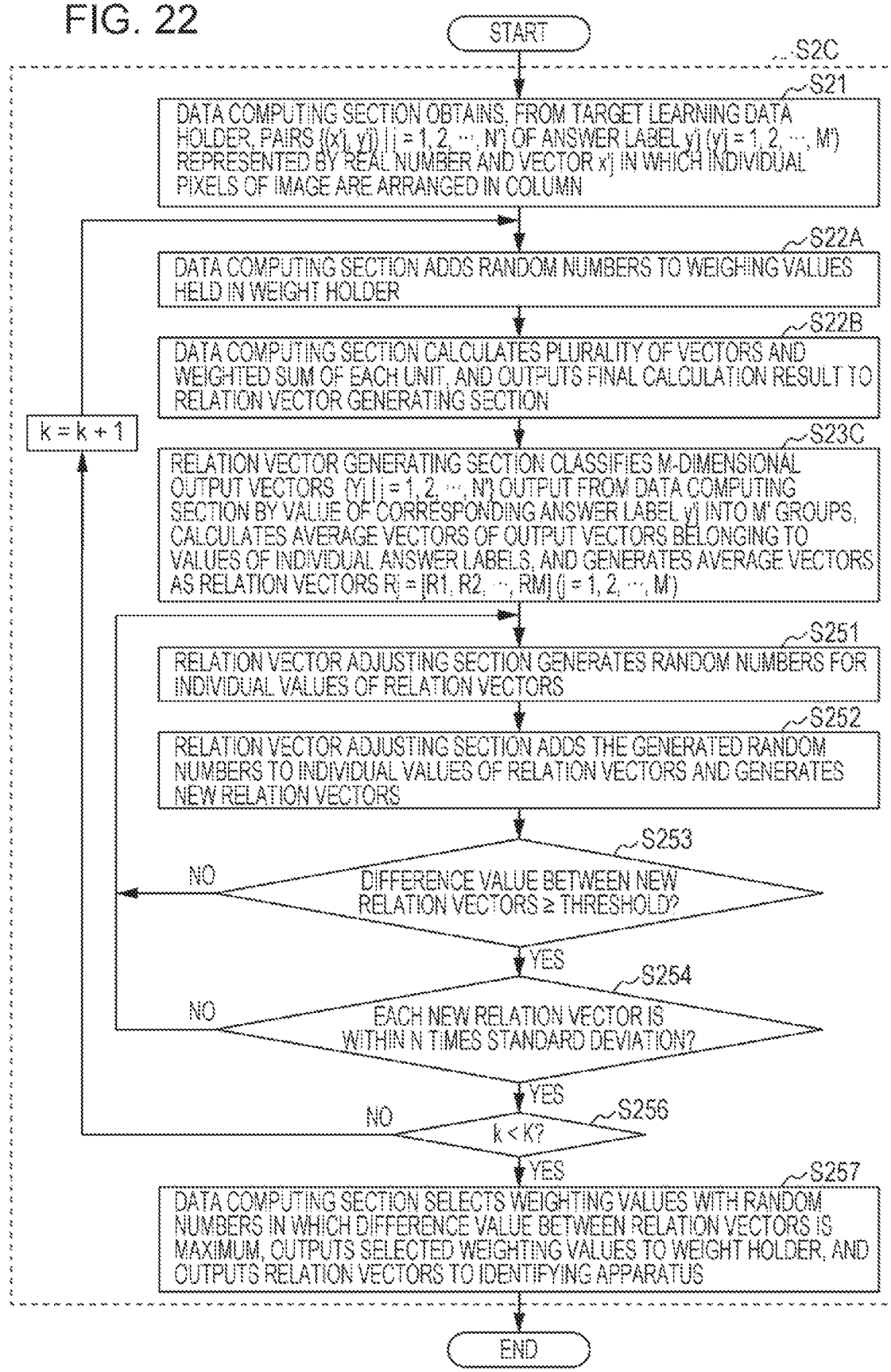
FIG. 22 is a flowchart illustrating another example of an operation of the transfer learning apparatus according to the third embodiment.

In the case of performing supervised learning on a target neural network, for example, loss functions (L1 and L2) representing an error between the answer vector Z and the output data Y may be defined by using input data X, weights W, and answer labels (for example, $L=|Y-Z|$, $\|$ represents an absolute value), and the weights W may be updated along a gradient for decreasing the loss functions by using the gradient descent method or back propagation. Also, random values may be added to the weighting values held in the weight holder 105 by the data computing section 103. FIG. 22 is a flowchart illustrating an example of the operation. In step S22A, the data computing section 103 adds random numbers to the weighing values held in the weight holder 105, In step S22B, the data computing section 103 calculates a plurality of vectors and a weighted sum of each unit, and outputs a final calculation result to the relation vector generating section. In step S256, it is determined whether or not k<K is satisfied. If k<K is satisfied (YES in step S256), the process proceeds to step S257 where the data computing section 103 selects weighting values with random numbers in which the difference value between relation vectors is the maximum, outputs the selected weighting values to the weight holder 105, and outputs relation vectors to the identifying apparatus. If k<K is not satisfied (NO in step S256), the process returns to step S22A with k=k+1. Accordingly, a transfer learning apparatus in which a distance between relation vectors is further increased can be obtained.

Fourth Embodiment

Figure 17:
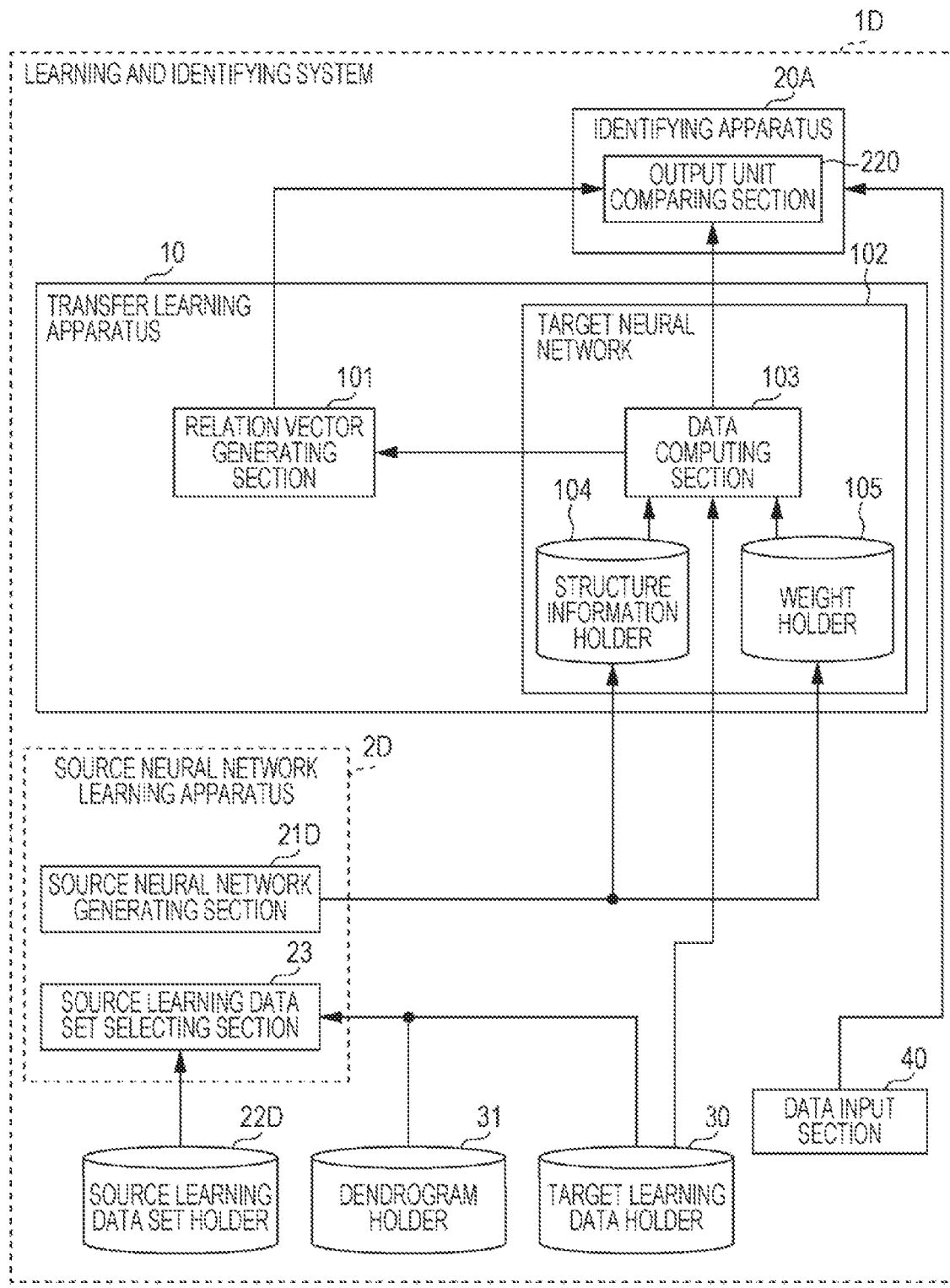
FIG. 17 is a block diagram illustrating an example of a functional configuration of a learning and identifying system according to a fourth embodiment.

In a fourth embodiment, a description will be given of a case where a learning and identifying system 1D is able to select source learning data that the source neural network learning apparatus is caused to learn on the basis of target learning data, Hereinafter, a description will be given mainly of a difference from the first embodiment.
Configuration of Learning and Identifying System 1D FIG. 17 is a block diagram illustrating an example of a functional configuration of the learning and identifying system 1D according to the fourth embodiment. The same elements as those in FIGS. 3 and 7 are denoted by the same reference numerals, and a detailed description thereof is omitted.

The learning and identifying system 1D illustrated in FIG. 17 includes a source neural network learning apparatus 2D, the transfer learning apparatus 10, the identifying apparatus 20A, a source learning data set holder 22D, the target learning data holder 30, a dendrogram holder 31, and the data input section 40.

The learning and identifying system 1D illustrated in FIG. 17 is different from the learning and identifying system 1A according to the first embodiment illustrated in FIG. 7 in that the dendrogram holder 31 is included and that the source neural network learning apparatus 2D and the source learning data set holder 22D are included instead of the source neural network learning apparatus 2A and the source learning data holder 22A.
Configuration of Source Learning Data Set Holder 22D The source learning data set holder 22D is formed of a memory, for example, and holds a plurality of sets of source learning data, which is learning data with answer labels (hereinafter referred to as a plurality of source learning data sets). Here, a source learning data set is, for example, a numeric image set, a general image set, a two-dimensional electrophoretic profile set, or a CT image set.
Configuration of Dendrogram Holder 31

The dendrogram holder 31 is formed of a memory, for example, and holds distance information for calculating similarities between answer labels. In this embodiment, the dendrogram holder 31 holds a dendrogram related to a plurality of source learning data sets and target learning data. Here, the dendrogram is a graph representing an interrelation among target objects by using a dendritic structure, Hereinafter, a description will be given of a dendrogram related to general creatures for simplifying the description, but the dendrogram is not limited thereto. For example, to determine whether or not a subject is "sepsis", it is possible to identify "sepsis" and "non-sepsis" on the basis of a two-dimensional electrophoretic profile by using a dendrogram created on the basis of proteins that vary according to disease.

Figure 18:
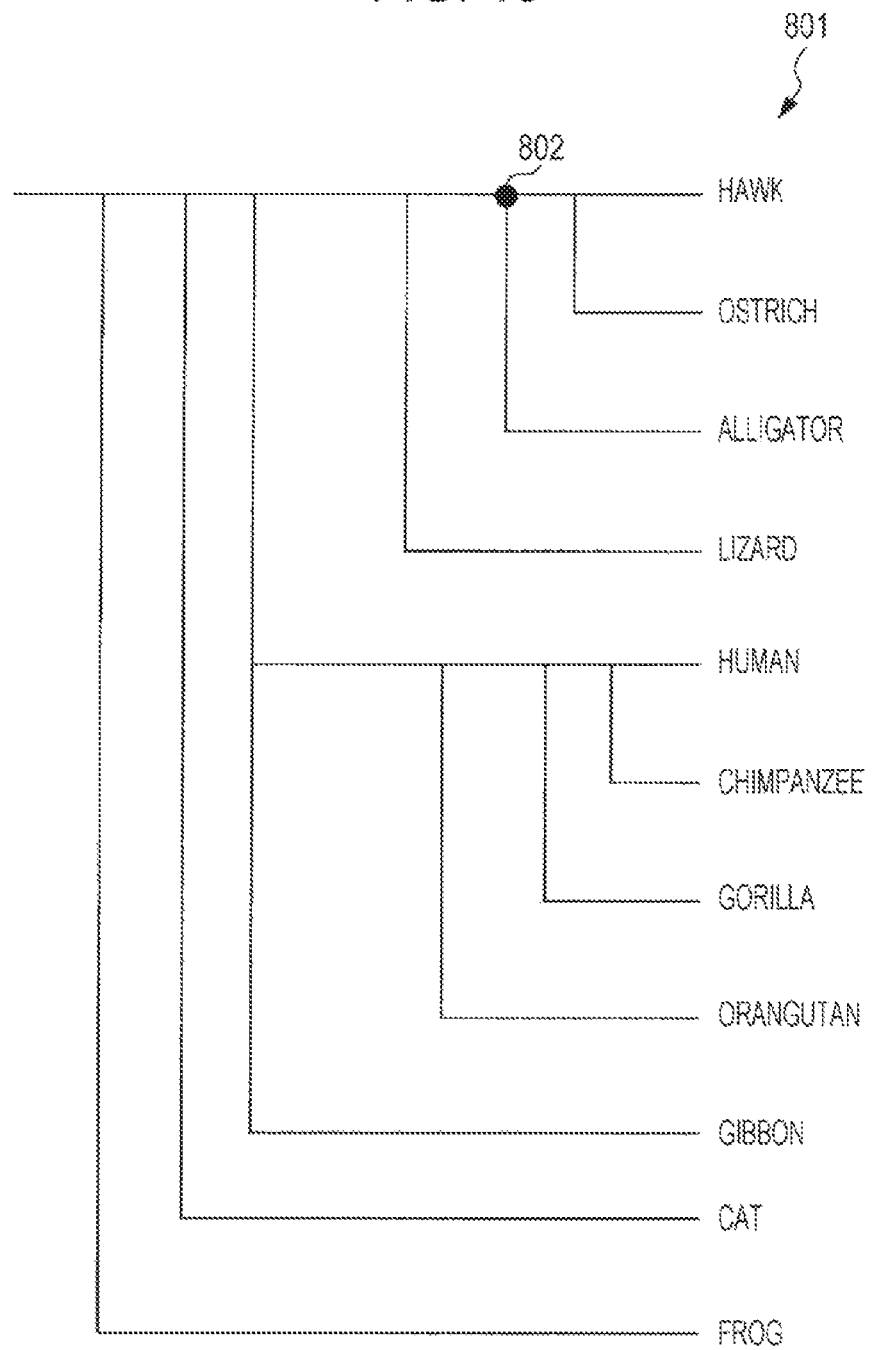
FIG. 18 is a diagram illustrating an example of a dendrogram held in a dendrogram holder according to the fourth embodiment.

FIG. 18 is a diagram illustrating an example of a dendrogram 801 held in the dendrogram holder 31 according to the fourth embodiment. FIG. 18 illustrates a dendrogram related to "human".

For example, it is understood from the dendrogram 801 illustrated in FIG. 18 that the animal closest to "human" is "chimpanzee". In this way, the similarities of answer labels can be calculated on the basis of distances between answer labels on the dendrogram 801.
Configuration of Source Neural Network Learning Apparatus 2D The source neural network learning apparatus 2D includes a source neural network generating section 21D and a source learning data set selecting section 23, as illustrated in FIG. 17.

The source learning data set selecting section 23 calculates the similarities between all answer labels attached to a plurality of source learning data sets and all answer labels attached to target learning data by using distance information that is held in the dendrogram holder 31 and that is used to calculate the similarities between answer labels. On the basis of the calculated similarities, the source learning data set selecting section 23 selects, from among the plurality of source learning data sets, a source learning data set attached with an answer label closest to all answer labels attached to the target learning data. That is, the source learning data set selecting section 23 selects an optimum source learning data set from among the plurality of source learning data sets.

Subsequently, the source learning data set selecting section 23 outputs the selected source learning data set to the source neural network generating section 21.

In this embodiment, the source learning data set selecting section 23 selects, from among the plurality of source learning data sets, a source learning data set to be used for learning on the basis of the distances on the dendrogram held in the dendrogram holder 31.

The source neural network generating section 21D receives, from a user, structure information representing the structure of a neural network, such as the number of hidden layers and the number of neurons in each hidden layer. Also, the source neural network generating section 21D performs learning of a neural network having a structure determined on the basis of received structure information by using the source learning data set output from the source learning data set selecting section 23, and generates a source neural network.

The individual components of the source neural network learning apparatus 2D may be implemented as software functions that are executed through execution of a predetermined program by an image processor and/or microprocessor. Alternatively, the source neural network learning apparatus 2D may include the source learning data set holder 22D.

Operation of Learning and Identifying System 1D

Next, an operation of the learning and identifying system 10 having the above-described configuration will be described.

Figure 19:
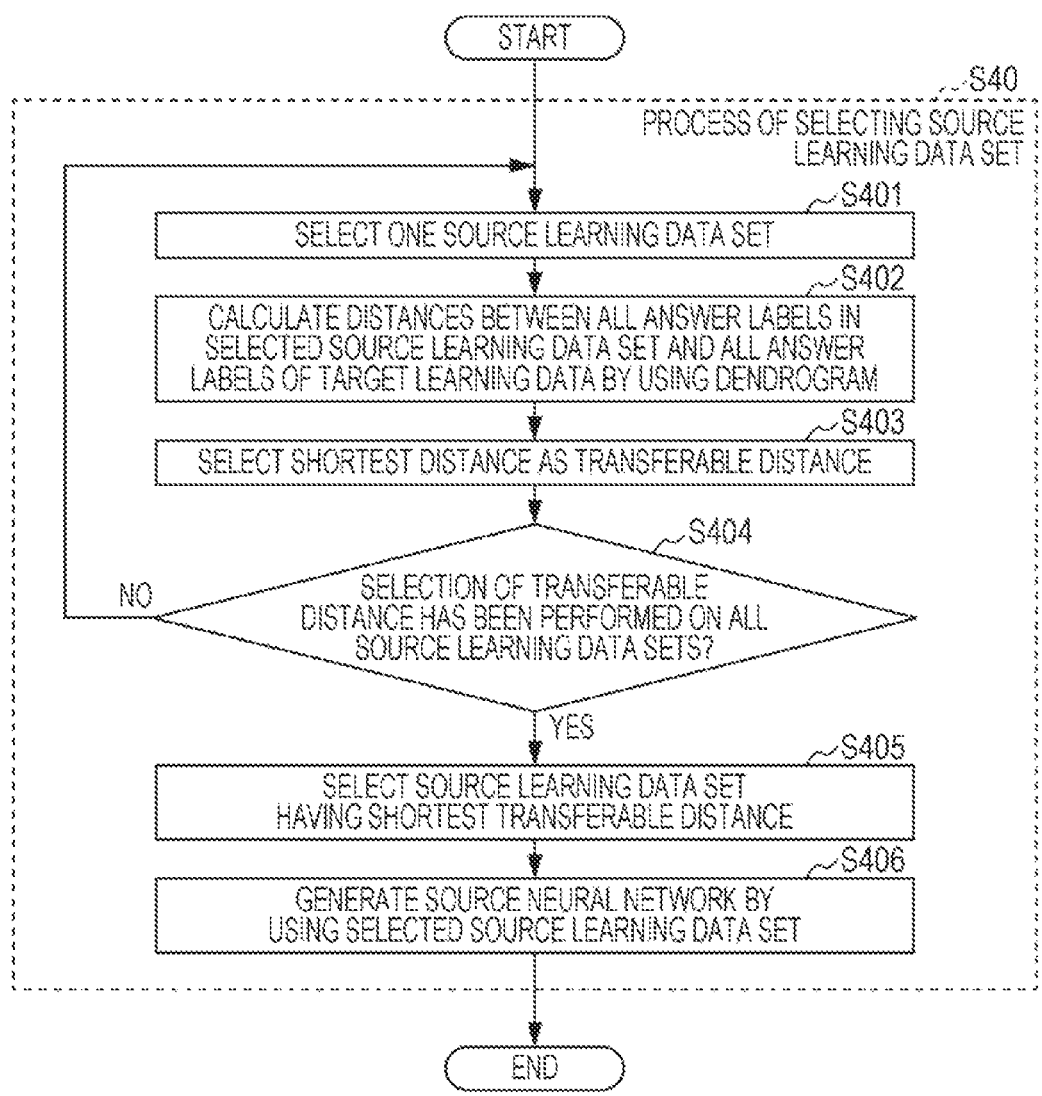
FIG. 19 is a flowchart illustrating an example of a part of an operation performed in the learning and identifying system according to the fourth embodiment.

FIG. 19 is a flowchart illustrating an example of a part of the operation performed in the learning and identifying system 1D according to the fourth embodiment. FIG. 19 illustrates a process of selecting a source learning data set performed by the source neural network learning apparatus 2D (S40). The source learning performed by the source neural network learning apparatus 2D and the target learning performed by the transfer learning apparatus 10 are similar to steps S1 and S2 described above with reference to FIG. 8, and thus the description thereof is omitted here. The process of selecting a source learning data set in step S40 is performed between steps S11 and S12 in step S1 described above with reference to FIG. 8.

As illustrated in FIG. 19, the source neural network learning apparatus 2D performs the process of selecting a source learning data set (S40).

More specifically, the source learning data set selecting section 23 selects one of the plurality of source learning data sets held in the source learning data set holder 22D (S401).

Subsequently, the source learning data set selecting section 23 calculates the distances between all answer labels in the selected source learning data set and all answer labels of target learning data by using the dendrogram held in the dendrogram holder 31 (S402).

Subsequently, the source learning data set selecting section 23 selects the shortest distance from among the calculated distances as a transferable distance (S403).

Subsequently, the source learning data set selecting section 23 determines whether or not selection of a transferable distance has been performed on all the source learning data sets (S404). If selection of a transferable distance has not been performed on all the source learning data sets (NO in S404), the process returns to step S401 and the process is repeated.

On the other hand, if selection of a transferable distance has been performed on all the source learning data sets (YES in S404), the source learning data set selecting section 23 selects a source learning data set having the shortest transferable distance of the selected transferable distances (S405).

Subsequently, the source neural network generating section 21D generates a source neural network by using the source learning data set that is held in the source learning data set holder 22D and that is selected by the source learning data set selecting section 23 (S406).

Example

In this example, a description will be given of a case where the dendrogram holder 31 holds the dendrogram 801 illustrated in FIG. 18 and where the source learning data set selecting section 23 selects a source learning data set from among a plurality of source learning data sets by using the distance information calculated on the basis of the dendrogram 801.

The source learning data set selecting section 23 calculates the distances between all answer labels of target learning data and answer labels in all source learning data sets and selects a source learning data set having the shortest distance. Here, the distances can be calculated on the basis of the number of nodes 802 on the dendrogram 801.

For example, it is assumed that "human" and "frog" are included as answer labels of target learning data. Also, it is assumed that "chimpanzee", "gorilla", "orangutan", and "gibbon" are included as answer labels in a source learning data set A.

In this case, the source learning data set selecting section 23 calculates the distance on the dendrogram 801 between "human" and "chimpanzee" as 1 (the number of nodes used for classification is 1) and the distance on the dendrogram 801 between "human" and "gorilla" as 2 (the number of nodes used for classification is 2). Also, the source learning data set selecting section 23 calculates the distance on the dendrogram 801 between "human" and "orangutan" as 3 (the number of nodes used for classification is 3) and the distance on the dendrogram 801 between "human" and "gibbon" as 4 (the number of nodes used for classification is 4).

Also, the source learning data set selecting section 23 calculates the distance on the dendrogram 801 between "frog" and "chimpanzee" as 7 (the number of nodes used for classification is 7) and the distance on the dendrogram 801 between "frog" and "gorilla" as 6 (the number of nodes used for classification is 6). Also, the source learning data set selecting section 23 calculates the distance on the dendrogram 801 between "frog" and "orangutan" as 5 (the number of nodes used for classification is 5) and the distance on the dendrogram 801 between "frog" and "gibbon" as 4 (the number of nodes used for classification is 4).

Thus, the source learning data set selecting section 23 selects "1", which is the distance between "human" and "chimpanzee", as a transferable distance in the source learning data set A.

On the other hand, it is assumed that "cat", "gorilla", "hawk", and "lizard" are included as answer labels in another source learning data set B. In this case, the source learning data set selecting section 23 selects "2", which is the distance between "human" and "gorilla" and the distance between "frog" and "cat", as a transferable distance in the source learning data set.

Accordingly, the source learning data set selecting section 23 selects the source learning data set A corresponding to "1", which is the shortest transferable distance of the selected transferable distances.

In the above-described example, the shortest distance to "frog" is "4" in the source learning data set A, which is longer than the shortest distance "1" to "human". On the other hand, in the source learning data set B, the shortest distance to both "frog" and "human" is "2". In this embodiment, the source learning data set selecting section 23 regards a minimum value of shortest distances to individual answer labels of target learning data, not an average value of the shortest distances, as a transferable distance. This is because, in transfer learning, higher identification accuracy is expected when there is source learning data that is very close even partially on a dendrogram. For example, if learning can be performed to accurately identify target learning data having an answer label "human", target learning data having another answer label, for example, "frog", can also be identified highly accurately by the identifying apparatus 20.

Advantages of Fourth Embodiment

As described above, according to the learning apparatus and the learning and identifying system according to the fourth embodiment, a source neural network can be generated by using a source learning data set including source learning data that is closest to target learning data in a dendrogram. That is, a source neural network is generated by using a source learning data set including source learning data that is more similar to target learning data. Accordingly, a source learning data set that is most suitable for transfer learning can be selected, and thus an increase in identification accuracy can be expected.

As described above in the first and second embodiments, a data formatting process including normalization, threshold process, noise reduction, and data size matching may be performed on the data input to the source neural network learning apparatus 2D and the transfer learning apparatus 10. Normalization may be performed on an answer vector as well as input data. The data formatting process may be performed by either the source neural network learning apparatus 2 or the transfer learning apparatus 10C.

The learning apparatus and the learning and identifying system according to the fourth embodiment may further include the weight adjusting section described in the second embodiment and the relation vector adjusting section described in the third embodiment. In this case, for example, a source learning data set may be generated and then relation vectors may be generated and weights may be adjusted.

According to this configuration, as a result of performing supervised learning by using target learning data, with relation vectors being used as answer vectors, weighting values in a target neural network can be updated by using weighting values of a source neural network that has learned as initial values. Accordingly, the weighting values of the source neural network that has learned can be optimized without being used as-is, and thus overfitting, which may occur when learning is performed by using a small amount of target learning data, can be suppressed.

In the case of performing supervised learning on a target neural network, for example, loss functions (L1 and L2) representing an error between the answer vector Z and the output data Y may be defined by using input data X, weights W, and answer labels (for example, $L=|Y-Z|$, $\|$ represents an absolute value), and the weights W may be updated along a gradient for decreasing the loss functions by using the gradient descent method or back propagation.

The learning apparatuses, the identifying apparatuses, and the learning and identifying systems according to the embodiments of the present disclosure have been described above. The present disclosure is not limited to these embodiments.

For example, a learning apparatus, an identifying apparatus, and a learning and identifying system according to an embodiment of the present disclosure may be implemented by using a computer.

Figure 20:
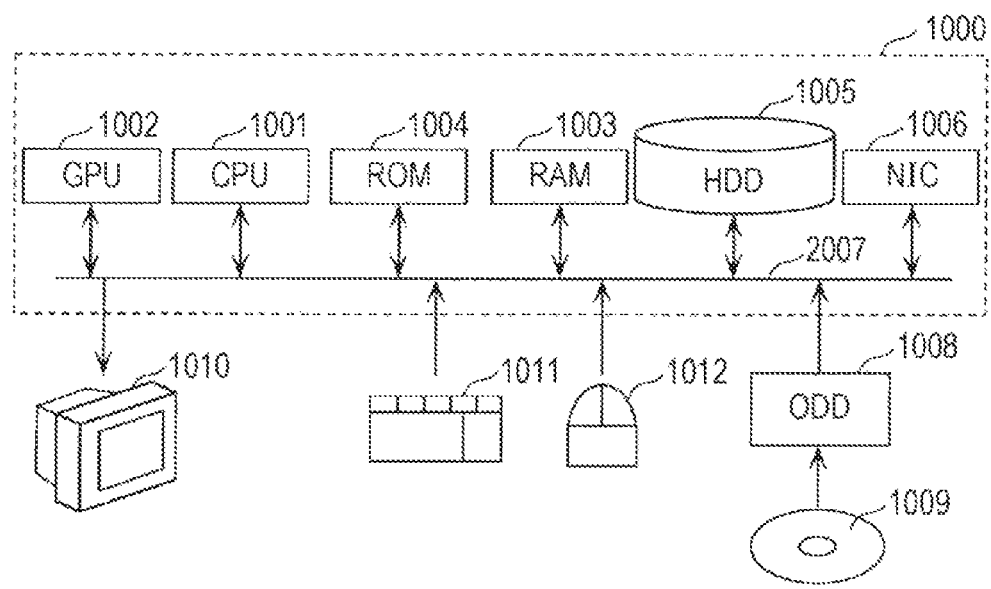
FIG. 20 is a block diagram illustrating an example of a hardware configuration for implementing a learning apparatus, an identifying apparatus, and a learning and identifying system according to an embodiment of the present disclosure.

FIG. 20 is a block diagram illustrating a hardware configuration for implementing a learning apparatus, an identifying apparatus, and a learning and identifying system according to an embodiment of the present disclosure.

The learning apparatus, the identifying apparatus, and the learning and identifying system according to the embodiment of the present disclosure includes a computer 1000, a keyboard 1011 and a mouse 1012 for providing instructions to the computer 1000, a display 1010 for presenting information such as a computation result generated by the computer 1000, and an optical disk drive (ODD) 1008 for reading a program to be executed by the computer 1000.

The program executed by the learning apparatus, the identifying apparatus, and the learning and identifying system according to the embodiment of the present disclosure is stored in a computer-readable optical storage medium 1009 and is read by the ODD 1008, or is read by a network interface controller (NIC) 1006 through a computer network.

The computer 1000 includes a central processing unit (CPU) 1001, a read only memory (ROM) 1004, a random access memory (RAM) 1003, a hard disk drive (HDD) 2005, the NIC 1006, and a bus 1007.

The computer 1000 may further include a graphical processing unit (GPU) 1002 for performing high-speed computation.

The CPU 1001 and the GPU 1002 execute a program read through the ODD 1008 or the NIC 1006. The ROM 1004 stores programs and data that are necessary for operation of the computer 1000. The RAM 1003 stores data, such as parameters for executing a program. The HDD 1005 stores programs and data. The NIC 1006 communicates with another computer through a computer network. The bus 1007 connects the CPU 1001, the ROM 1004, the RAM 1003, the HDD 1005, the MC 1006, the display 1010, the keyboard 1011, the mouse 1012, and the ODD 1008 to one another. The keyboard 1011, the mouse 1012, and the ODD 1008 that are connected to the computer 1000 may be disconnected from the computer 1000 in a case where the display 1010 is a touch screen or in a case where the NIC 1006 is used.

Furthermore, some or all of the elements of each of the above-described apparatuses may be formed of one system large scale integration (LSI). The system LSI is a super-multifunction LSI manufactured by stacking a plurality of components on one chip, and is specifically a computer system including a microprocessor, a ROM, a RAM, and so forth. The RAM stores a computer program. When the microprocessor operates in accordance with the computer program, the system LSI achieves its function.

Some or all of the elements of each of the above-described apparatuses may be formed of an IC card or single module that is attachable to/detachable from each apparatus. The IC card or module is a computer system including a microprocessor, a ROM, a RAM, and so forth. The IC card or module may include the above-mentioned super-multifunction LSI. When the microprocessor operates in accordance with the computer program, the IC card or module achieves its function. The IC card or module may be tamper resistant.

The present disclosure may include the above-described methods. Also, the present disclosure may include a computer program that executes these methods by using a computer or digital signals formed of the computer programs.

Furthermore, the present disclosure may include a non-transitory computer-readable storage medium, for example, a flexible disk, a hard disk, a CD-ROM, an MO, a DVD, a DVD-ROM, a DVD-RAM, a Blu-ray (registered trademark) disc (BD), or a semiconductor memory, storing the computer program or the digital signals. Also, the present disclosure may include the digital signals recorded on the non-transitory storage medium.

In the present disclosure, the computer program or the digital signals may be transmitted through an electric communication line, a wireless or wired communication circuit, a network represented by the Internet, data broadcasting, or the like.

The foregoing program or digital signals may be transferred by recording it on the non-transitory storage medium, or the foregoing program or digital signals may be transferred through the foregoing network or the like, so as to be executed by another independent computer system.

Figure 21:
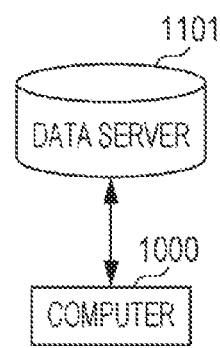
FIG. 21 is a schematic diagram illustrating an example of a computer including a data server.

In an embodiment of the present disclosure, as illustrated in FIG. 21, a data server 1101 may be constructed in addition to the computer 1000, a memory or the like storing data may be provided in the data server 1101, and the computer 1000 may read information therefrom through the above-described network or the like. The computer 1000 that reads information from the data server 1101 is not necessarily single, and a plurality of computers 1000 may read information. In this case, each computer 1000 may implement part of elements of a learning apparatus, an identifying apparatus, and a learning and identifying system according to an embodiment of the present disclosure.

Furthermore, the above-described embodiments and modifications may be combined.

The embodiments disclosed above are merely examples and are not restrictive from all points of view. The scope of the present disclosure is defined by the following claims, not by the description given above, and includes equivalents of the claims and all changes within the scope of the present disclosure.

An embodiment of the present disclosure is applicable to a learning apparatus, an identifying apparatus, a learning and identifying system, and a recording medium, and more specifically to a learning apparatus, an identifying apparatus, a learning and identifying system, and a recording medium that enable transfer learning for identifying and/or classifying images or sensor values without being influenced by overfitting.

What is claimed is:

1. A learning apparatus comprising:
   at least one memory; and
   at least one circuit,
   wherein the circuit
   (a) obtains a first neural network that has learned by using source learning data which is learning data with answer labels in a source domain and obtains target learning data which is learning data with answer labels in a target domain, the target learning data including a plurality of first data items each of which is given a first label and a plurality of second data items each of which is given a second label,
   (b) obtains a plurality of first output vectors by inputting the plurality of first data items to a second neural network and obtains a plurality of second output vectors by inputting the plurality of second data items to the second neural network, the first neural network and the second neural network having identical weighting values, identical numbers of hidden layers, identical numbers of neurons in each of the hidden layers, identical numbers of neurons in an input layer, and identical numbers of neurons in an output layer, and
   (c) generates a first relation vector corresponding to the first label by using the plurality of first output vectors and generates a second relation vector corresponding to the second label by using the plurality of second output vectors,
   the second neural network outputs an output test vector in response to a test data item being input to the second neural network,
   the circuit outputs the first label when a first distance between the first relation vector and the output test vector is smaller than a second distance between the second relation vector and the output test vector, and
   the circuit outputs the second label when the second distance between the second relation vector and the output test vector is smaller than the first distance between the first relation vector and the output test vector.

2. The learning apparatus according to claim 1, wherein
   (i) an output vector obtained by inputting a first data item that is given the first label to the second neural network is closer to the first relation vector than to the second relation vector, and
   (ii) an output vector obtained by inputting a second data item that is given the second label to the second neural network is closer to the second relation vector than to the first relation vector.

3. The learning apparatus according to claim 1,
   wherein the circuit (d) updates weight information on the second neural network by using the first relation vector and the second relation vector, and
   in (d), the circuit updates the weight information by performing learning in which the plurality of first output vectors that are outputs for the plurality of first data items take the first relation vector as an answer, and the plurality of second output vectors that are outputs for the plurality of second data items take the second relation vector as an answer.

4. The learning apparatus according to claim 1, wherein
   in (c), the circuit generates an average vector of the plurality of first output vectors as the first relation vector and generates an average vector of the plurality of second output vectors as the second relation vector.

5. The learning apparatus according to claim 1, wherein
the learning apparatus holds a plurality of sets of source learning data which is learning data with answer labels, and distance information for calculating similarities among the answer labels, and
the circuit
(e) calculates distances between all answer labels given to the plurality of sets of source learning data and all answer labels given to the target learning data and selects a set of source learning data having a shortest distance from among the plurality of sets of source learning data,
(f) generates the first neural network through learning using the selected set of source learning data, and
(g) stores structure information and weighting values of the generated first neural network in the memory.

6. The learning apparatus according to claim 1, wherein
the target learning data includes a two-dimensional electrophoretic profile of proteins separated based on an isoelectric point and a molecular weight,
the first label indicates sepsis, and
the second label indicates non-sepsis.

7. The learning apparatus according to claim 6, wherein
the source learning data includes a two-dimensional electrophoretic profile of proteins separated based on an isoelectric point and a molecular weight in a healthy person, and
an answer label of the source learning data indicates a healthy person.

8. A learning apparatus comprising:
at least one memory; and
at least one circuit,
wherein the circuit
(a) obtains a first neural network that has learned by using source learning data which is learning data with answer labels in a source domain and obtains target learning data which is learning data with answer labels in a target domain, the target learning data including a plurality of first data items each of which is given a first label and a plurality of second data items each of which is given a second label,
(b) obtains a plurality of first output vectors by inputting the plurality of first data items to a second neural network and obtains a plurality of second output vectors by inputting the plurality of second data items to the second neural network, the first neural network and the second neural network having identical weighting values, identical numbers of hidden layers, identical numbers of neurons in each of the hidden layers, identical numbers of neurons in an input layer, and identical numbers of neurons in an output layer,
(c) generates a first relation vector corresponding to the first label by using the plurality of first output vectors and generates a second relation vector corresponding to the second label by using the plurality of second output vectors, and
(d) updates weight information on the second neural network by using the first relation vector and the second relation vector,
in (d), the circuit updates the weight information by performing learning in which the plurality of first output vectors that are outputs for the plurality of first data items take the first relation vector as an answer, and the plurality of second output vectors that are outputs for the plurality of second data items take the second relation vector as an answer in (c), the circuit adjusts a value of the first relation vector and a value of the second relation vector so that
the value of the first relation vector is within a range of a constant multiple of a first standard deviation calculated from the plurality of first output vectors,
the value of the second relation vector is within a range of a constant multiple of a second standard deviation calculated from the plurality of second output vectors, and
a difference value between the first relation vector and the second relation vector is increased.

9. An identifying apparatus comprising:
a first circuit,
wherein the first circuit (v) obtains a first relation vector and a second relation vector from a learning apparatus including a second circuit,
wherein the second circuit
(a) obtains a first neural network that has learned by using source learning data which is learning data with answer labels in a source domain and obtains target learning data which is learning data with answer labels in a target domain, the target learning data including a plurality of first data items each of which is given a first label and a plurality of second data items each of which is given a second label,
(b) obtains a plurality of first output vectors by inputting the plurality of first data items to a second neural network and obtains a plurality of second output vectors by inputting the plurality of second data items to the second neural network, the first neural network and the second neural network having identical weighting values, identical numbers of hidden layers, identical numbers of neurons in each of the hidden layers, identical numbers of neurons in an input layer, and identical numbers of neurons in an output layer, and
(c) generates the first relation vector corresponding to the first label by using the plurality of first output vectors and generates the second relation vector corresponding to the second label by using the plurality of second output vectors, and
wherein the first circuit
(w) obtains test data which is data without a label and of a type identical to the target learning data,
(x) obtains an output vector for the obtained test data by inputting the test data to the second neural network,
(y) calculates a distance between the obtained output vector and the first relation vector and a distance between the obtained output vector and the second relation vector, and
(z) outputs, as an answer label for the test data, the first label or the second label corresponding to one of the first relation vector and the second relation vector that is closer to the output vector.

10. A learning and identifying system comprising:
a learning apparatus including at least one memory and at least one first circuit; and
an identifying apparatus including at least one second circuit,
wherein the first circuit of the learning apparatus
(a) obtains a first neural network that has learned by using source learning data which is learning data with answer labels in a source domain and obtains target learning data which is learning data with answer labels in a target domain, the target learning data including a plurality of first data items each of which is given a first label and a plurality of second data items each of which is given a second label, (b) obtains a plurality of first output vectors by inputting the plurality of first data items to a second neural network and obtains a plurality of second output vectors by inputting the plurality of second data items to the second neural network, the first neural network and the second neural network having identical weighting values, identical numbers of hidden layers, identical numbers of neurons in each of the hidden layers, identical numbers of neurons in an input layer, and identical numbers of neurons in an output layer, and (c) generates a first relation vector corresponding to the first label by using the plurality of first output vectors and generates a second relation vector corresponding to the second label by using the plurality of second output vectors, and wherein the second circuit of the identifying apparatus (v) obtains the first relation vector and the second relation vector from the learning apparatus, (w) obtains test data which is data without a label and of a type identical to the target learning data, (x) obtains an output vector for the obtained test data by inputting the test data to the second neural network, (y) calculates a distance between the obtained output vector and the first relation vector and a distance between the obtained output vector and the second relation vector, and (z) outputs, as an answer label for the test data, the first label or the second label corresponding to one of the first relation vector and the second relation vector that is closer to the output vector.

11. A non-transitory computer-readable recording medium storing a control program for causing a device including a processor to execute a process, the process causing a circuit included in a learning apparatus to (a) obtain a first neural network that has learned by using source learning data which is learning data with answer labels in a source domain and obtain target learning data which is learning data with answer labels in a target domain, the target learning data including a plurality of first data items each of which is given a first label and a plurality of second data items each of which is given a second label, (b) obtain a plurality of first output vectors by inputting the plurality of first data items to a second neural network and obtain a plurality of second output vectors by inputting the plurality of second data items to the second neural network, the first neural network and the second neural network having identical weighting values, identical numbers of hidden layers, identical numbers of neurons in each of the hidden layers, identical numbers of neurons in an input layer, and identical numbers of neurons in an output layer, and (c) generate a first relation vector corresponding to the first label by using the plurality of first output vectors and generate a second relation vector corresponding to the second label by using the plurality of second output vectors, the second neural network outputs an output test vector in response to a test data item being input to the second neural network, the circuit outputs the first label when a first distance between the first relation vector and the output test vector is smaller than a second distance between the second relation vector and the output test vector, and the circuit outputs the second label when the second distance between the second relation vector and the output test vector is smaller than the first distance between the first relation vector and the output test vector.

12. A non-transitory computer-readable recording medium storing a control program for causing a device including a processor to execute a process, the process causing a first circuit included in an identifying apparatus to (v) obtain a first relation vector and a second relation vector from a learning apparatus including a second circuit, the process causing the second circuit to (a) obtain a first neural network that has learned by using source learning data which is learning data with answer labels in a source domain and obtain target learning data which is learning data with answer labels in a target domain, the target learning data including a plurality of first data items each of which is given a first label and a plurality of second data items each of which is given a second label, (b) obtain a plurality of first output vectors by inputting the plurality of first data items to a second neural network and obtain a plurality of second output vectors by inputting the plurality of second data items to the second neural network, the first neural network and the second neural network having identical weighting values, identical numbers of hidden layers, identical numbers of neurons in each of the hidden layers, identical numbers of neurons in an input layer, and identical numbers of neurons in an output layer, and (c) generate the first relation vector corresponding to the first label by using the plurality of first output vectors and generate the second relation vector corresponding to the second label by using the plurality of second output vectors, and the process causing the first circuit to (w) obtain test data which is data without a label and of a type identical to the target learning data, (x) obtain an output vector for the obtained test data by inputting the test data to the second neural network, (y) calculate a distance between the obtained output vector and the first relation vector and a distance between the obtained output vector and the second relation vector, and (z) output, as an answer label for the test data, the first label or the second label corresponding to one of the first relation vector and the second relation vector that is closer to the output vector.

13. A learning apparatus comprising:
at least one memory; and
at least one circuit,
wherein the circuit (a) obtains a neural network that has learned by using source learning data which is learning data with answer labels in a source domain and obtains target learning data which is learning data with answer labels in a target domain, the target learning data including a plurality of first data items each of which is given a first label and a plurality of second data items each of which is given a second label, (b) obtains a plurality of first output vectors by inputting the plurality of first data items to the neural network and obtains a plurality of second output vectors by inputting the plurality of second data items to the neural network, and (c) generates a first relation vector corresponding to the first label by using the plurality of first output vectors and generates a second relation vector corresponding to the second label by using the plurality of second output vectors, the second neural network outputs an output test vector in response to a test data item being input to the second neural network, the circuit outputs the first label when a first distance between the first relation vector and the output test vector is smaller than a second distance between the second relation vector and the output test vector, and the circuit outputs the second label when the second distance between the second relation vector and the output test vector is smaller than the first distance between the first relation vector and the output test vector.

14. A learning apparatus comprising:

a circuit; and a memory, wherein the circuit, in a preparation step,
- (a-1) obtains structure information indicating a structure of a first neural network and first weighting values used to stipulate relationships between neurons included in the first neural network, the first neural network having learned using first pairs of first data items and first answer labels, the first data items corresponding to the first answer labels, the structure information including a first number of hidden layers and indicating which of the neurons belongs to which layer among the hidden layers, an input layer, and an output layer,
- (a-2) obtains second pairs of second data items and a second answer label, and third pairs of third data items and a third answer label, the second data items corresponding to the second answer label, the third data items corresponding to the third answer label,
- (a-3) provides a second neural network having a structure identical to the first neural network and second weighting values used to stipulate relationships between neurons included in the second neural network, the second weighting values being identical to the first weighting values,
- (a-4) inputs the second data items to the second neural network and the third data items to the second neural network,
- (a-5) obtains second output vectors and third output vectors from the second neural network, each of the second data items corresponding to one of the second output vectors, each of the third data items corresponding to one of the third output vectors, the second output vectors being $x1=[x11, \ldots, x1i], \ldots,$ and $xn=[xn1, \ldots, xni]$, and the third output vectors being $y1=[y11, \ldots, y1i], \ldots,$ and $yn=[yn1, \ldots, yni]$, and
- (a-6) generates a first relation vector for the second answer label and a second relation vector for the third answer label, the first relation vector being $x=[(x11+ \ldots +xn1)/n, \ldots, (x1i+ \ldots +xni)/n]$, the second relation vector being $y=[(y11+ \ldots +yn1)/n, \ldots, (y1i+ \ldots +yni)/n]$, and wherein the circuit, in a testing step,
- (b-1) inputs a test data item to the second neural network,
- (b-2) obtains an output test vector from the second neural network, the test data item corresponding to the output test vector, the output test vector being $z=[z11, \ldots, z1i]$,
- (b-3) calculates a first distance between the first relation vector and the output test vector and a second distance between the second relation vector and the output test output vector, the first distance being $[\{(x11+ \ldots +xn1)/n-z11\}^2+ \ldots + \{(x1i+ \ldots +xni)/n-z1i\}^2]^{1/2}$, the second distance being $[\{(y11+ \ldots +yn1)/n-z11\}^2+ \ldots + \{(y1i+ \ldots +yni)/n-z1i\}^2]^{1/2}$, and
- (b-4) outputs the second answer label when the first distance between the first relation vector and the output test vector is smaller than the second distance between the second relation vector and the output test output vector, and
- (b-5) outputs the third answer label when the second distance between the second relation vector and the output test output vector is smaller than the first distance between the first relation vector and the output test vector.

* * * * *